US012583679B2

(12) United States Patent　　　(10) Patent No.:　US 12,583,679 B2
　　　Gil et al.　　　　　　　　　　(45) Date of Patent:　　Mar. 24, 2026

(54) ASSET LOADING SYSTEM

(71) Applicant: United Parcel Service Of America, Inc., Atlanta, GA (US)

(72) Inventors: Julio Gil, Veldhoven (NL); Thomas Ramsager, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 721 days.

(21) Appl. No.: 17/981,214

(22) Filed: Nov. 4, 2022

(65) Prior Publication Data

US 2023/0053511 A1　　　Feb. 23, 2023

Related U.S. Application Data

(63) Continuation of application No. 16/731,312, filed on Dec. 31, 2019, now Pat. No. 11,492,202.

(51) Int. Cl.
　B65G 1/137　　　(2006.01)
　B25J 9/16　　　　(2006.01)
　B65G 67/04　　　(2006.01)
　G06Q 10/0832　　(2023.01)

(52) U.S. Cl.
　CPC .......... B65G 1/1376 (2013.01); B25J 9/1661 (2013.01); B65G 1/1371 (2013.01); B65G 67/04 (2013.01); G06Q 10/0832 (2013.01)

(58) Field of Classification Search
　CPC ........ B65G 67/20; B65G 67/04; B65G 67/08; B65G 2201/0285; B65G 1/1371; B65G 1/10; G06Q 10/083; G06Q 10/0832; G06Q 50/40; B25J 9/1661; B60P 3/007
　See application file for complete search history.

(56) References Cited

U.S. PATENT DOCUMENTS

| | | | |
|---|---|---|---|
| 4,909,697 A | 3/1990 | Bernard et al. | |
| 6,357,985 B1 | 3/2002 | Anzani et al. | |
| 6,439,822 B1 | 8/2002 | Kimura et al. | |
| 9,120,624 B1 * | 9/2015 | Cassady ............. | G06Q 10/0836 |
| 10,793,353 B2 * | 10/2020 | Nakano ..................... | B66F 9/06 |
| 2007/0041814 A1 * | 2/2007 | Lowe ................... | G01N 35/028 |
| | | | 414/273 |
| 2016/0221768 A1 * | 8/2016 | Kadaba ..................... | B60P 1/52 |
| 2016/0224930 A1 | 8/2016 | Kadaba et al. | |
| 2019/0299835 A1 | 10/2019 | Taylor et al. | |
| 2019/0367278 A1 | 12/2019 | Bellar et al. | |
| 2020/0074404 A1 | 3/2020 | Gil, Jr. et al. | |
| 2021/0198040 A1 | 7/2021 | Gil et al. | |

OTHER PUBLICATIONS

International Preliminary Report on Patentability received for PCT Patent Application No. PCT/US2020/057480, mailed on Jul. 14, 2022, 8 pages.
International Search Report and Written Opinion received for PCT Patent Application No. PCT/US2020/057480, dated Feb. 23, 2021, 11 pages.

* cited by examiner

*Primary Examiner* — Glenn F Myers

(74) *Attorney, Agent, or Firm* — Shook, Hardy & Bacon L.L.P.

(57)　　　　ABSTRACT

An identifier associated with one or more assets is obtained in response to a reader component reading a tag associated with one or more assets as the one or more assets traverse a conveyor apparatus. At least partially in response to the obtaining of the identifier, a storage unit of a plurality of storage units is caused to automatically rotate to a loading location to receive the one or more assets.

20 Claims, 15 Drawing Sheets

ID: 1, 3, F

DESTINATION: XYZ
SIZE: 2165
TYPE: PACKAGE

1200

1201

OBTAIN IDENTIFIER(S) OF ASET(S) IN RESPONSE TO A READER COMPONENT READING TAG(S) ASSOCIATED WITH THE ASSET(S)

1203

POPULATE A DATA STRUCTURE INDICATIVE OF ASSET SEQUENCE

1205

CAUSE A STORAGE UNIT OF A PLURALITY OF STORAGE UNITS TO AUTOMATICALLY ROTATE TO A LOADING LOCATION TO RECEIVE THE ASSET(S)

ASSET LOADING SYSTEM

CROSS REFERENCE TO RELATED APPLICATIONS

This application is a continuation of and claims the benefit of U.S. Non Provisional application Ser. No. 16/731,312 titled "Improved Asset Loading System," filed Dec. 31, 2019, which is hereby expressly incorporated by reference in its entirety.

BACKGROUND

Before an asset (e.g., a package or parcel) reaches a final delivery destination, it typically goes through various sorting operations. For instance, after a package has been dropped off at a carrier store for a delivery request, it may be routed to a sorting facility where the package traverses various different conveyor belt assemblies in the sorting facility based on information associated with the package (e.g., size of package, destination address, weight, etc.). After traversal of the package through the sorting center, the package may be loaded into a logistics vehicle for delivery to the final delivery destination or delivery to the next sorting phase operation.

Typical asset loading system technologies in the sorting and other contexts include a conveyor belt assembly. These conveyor belt assemblies may include a belt that is generally formed and/or extends around at least two driving wheels such that by rotation of the driving wheels, the conveyor belt surface may move an asset in a linear fashion. This may allow the asset to be picked and placed in a tray or other shelving location in preparation for delivery. However, these conveyor belt assembly technologies, shelving location technologies, and other components of asset loading systems are static and include limited functionality, as described in more detail herein.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter. Further, alternative or additional embodiments exist other than those described in this summary section.

Some embodiments are directed to a system that includes a plurality of storage units that are configured to receive one or more assets associated with performing one or more shipment operations. The system may also include a conveyor apparatus that is configured to relay the one or more assets. A first asset of the one or more assets may be configured to be picked from the conveyor apparatus and loaded onto at least one storage unit of the plurality of storage units for the one or more shipment operations. The conveyor apparatus can be communicatively coupled to the plurality of storage units or communicatively coupled to one or more computing devices associated with the plurality of storage units. The at least one storage unit of the plurality of storage units can be configured to automatically rotate to a loading location at least partially in response to receiving a communication from the conveyor apparatus or the one or more computing devices indicating an identifier associated with the first asset.

Some embodiments are directed to a conveyor apparatus that includes a rotating component that is configured to cause movement of one or more assets for loading the one or more assets into one or more storage units. The conveyor apparatus can further include a reader component configured to obtain an identifier associated with the one or more assets. The conveyor apparatus can further include a transmitting component configured to transmit, over a computer network, the identifier obtained by the reader component to the one or more storage units or one or more computing devices associated with the one or more storage units such that the one or more storage units are configured to rotate to a loading location for the loading of the one or more assets in response to receiving the identifier.

Some embodiments are directed to a computer-implemented method that includes the following operations. An identifier associated with one or more assets can be obtained in response to a reader component reading a tag associated with one or more assets as the one or more assets traverse a conveyor apparatus. At least partially in response to the obtaining of the identifier, a storage unit of a plurality of storage units can be caused to automatically rotate to a loading location to receive the one or more assets.

BRIEF DESCRIPTION OF THE DRAWINGS

Figure 1:
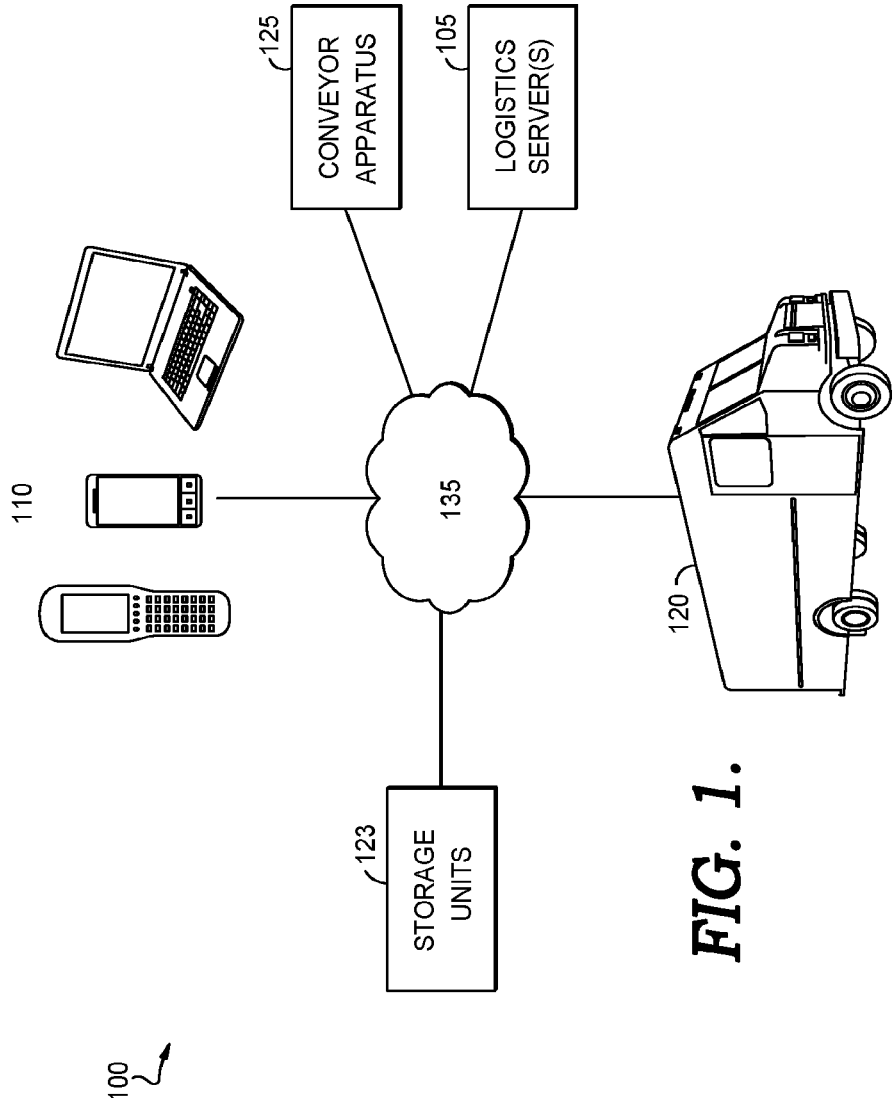

Having thus described the disclosure in general terms, reference will now be made to the accompanying drawings, which are not necessarily drawn to scale, and wherein:

FIG. 1 is a schematic diagram of an example computing environment in which aspects of the present disclosure are employed, according to some embodiments.

Figure 2:
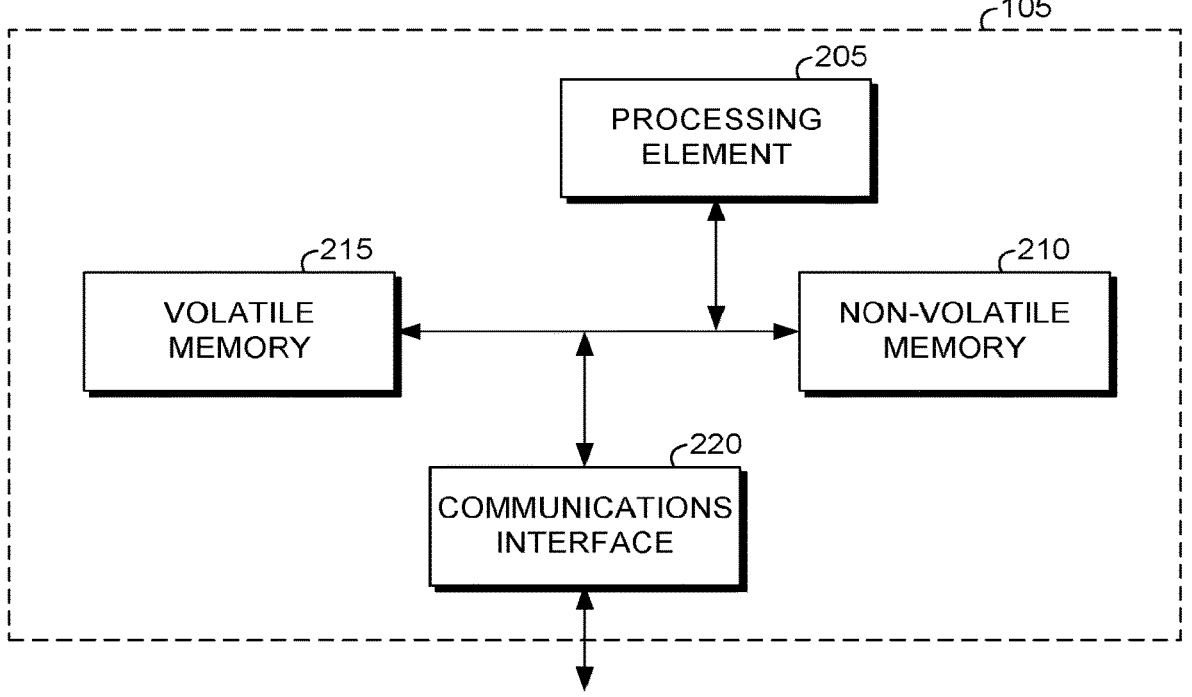

FIG. 2 is a schematic diagram of one or more logistics server(s) in which aspects of the present disclosure are employed, according to some embodiments.

Figure 3:
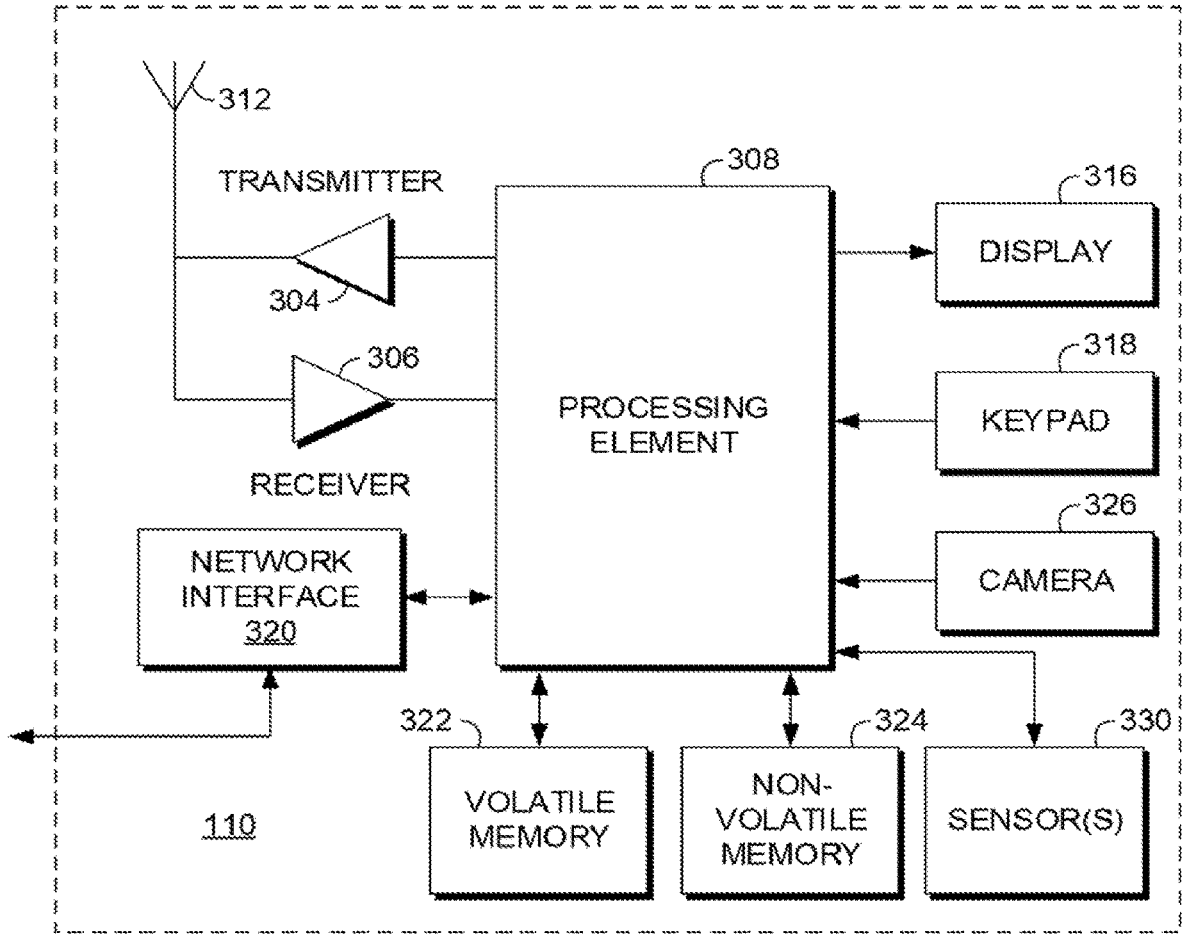

FIG. 3 is a schematic diagram of a computing entity in which aspects of the present disclosure are employed, according to some embodiments.

Figure 4A:
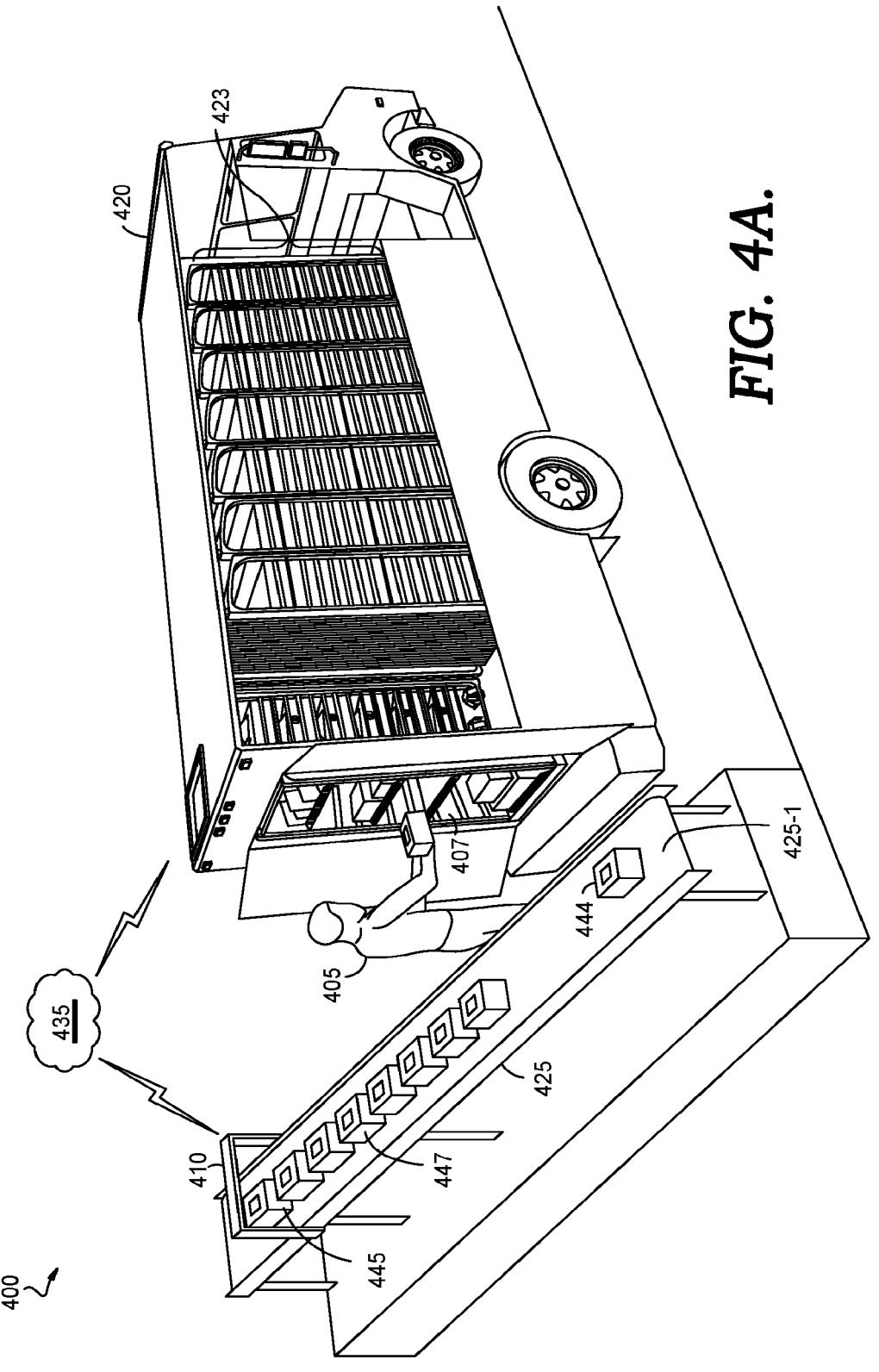

FIG. 4A is a schematic diagram of an environment illustrating how one or more assets are loaded into storage units inside a logistics vehicle, according to some embodiments.

Figure 4B:
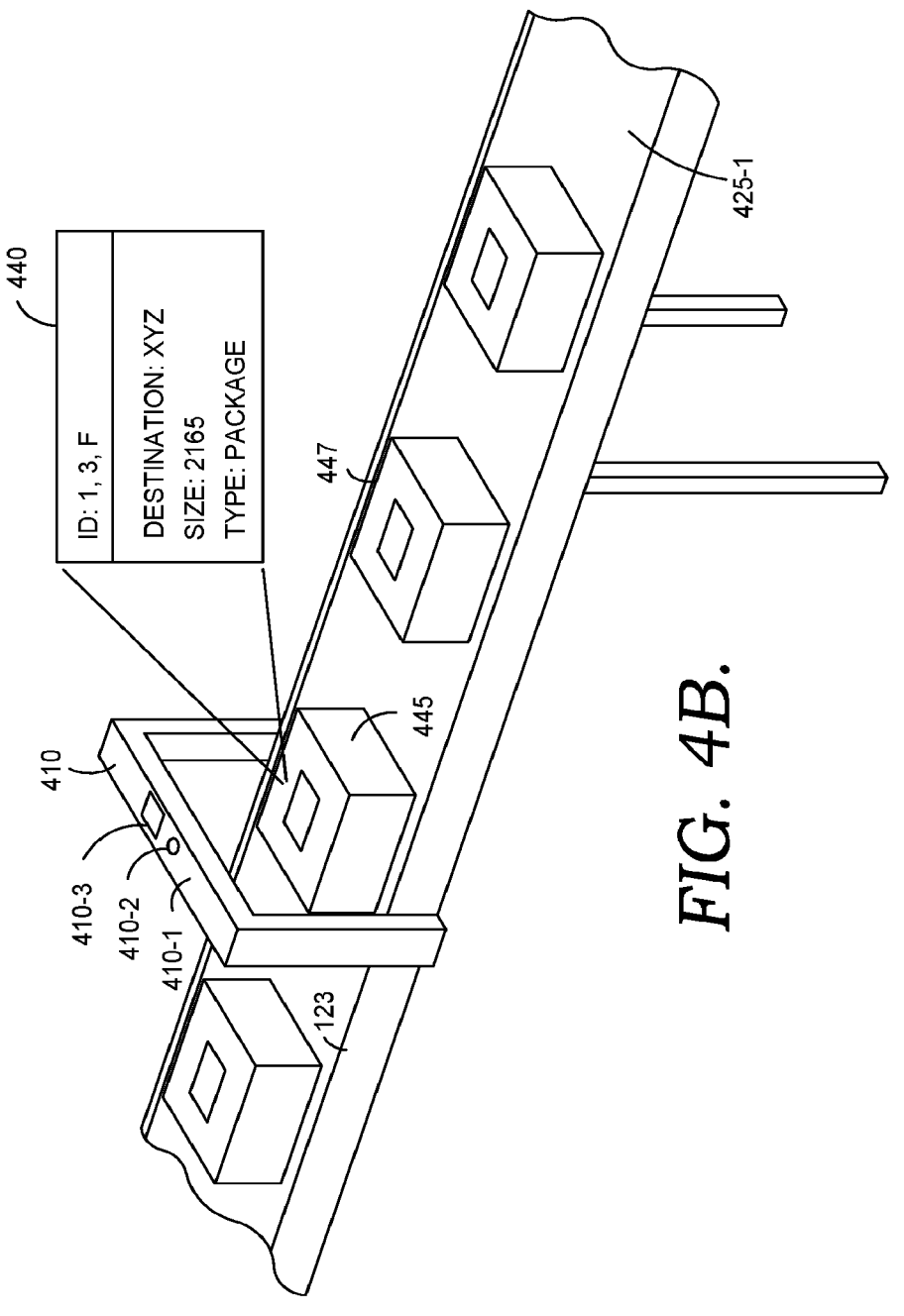

FIG. 4B is a more detailed view of the reading component of FIG. 4A, according to some embodiments.

Figure 5:
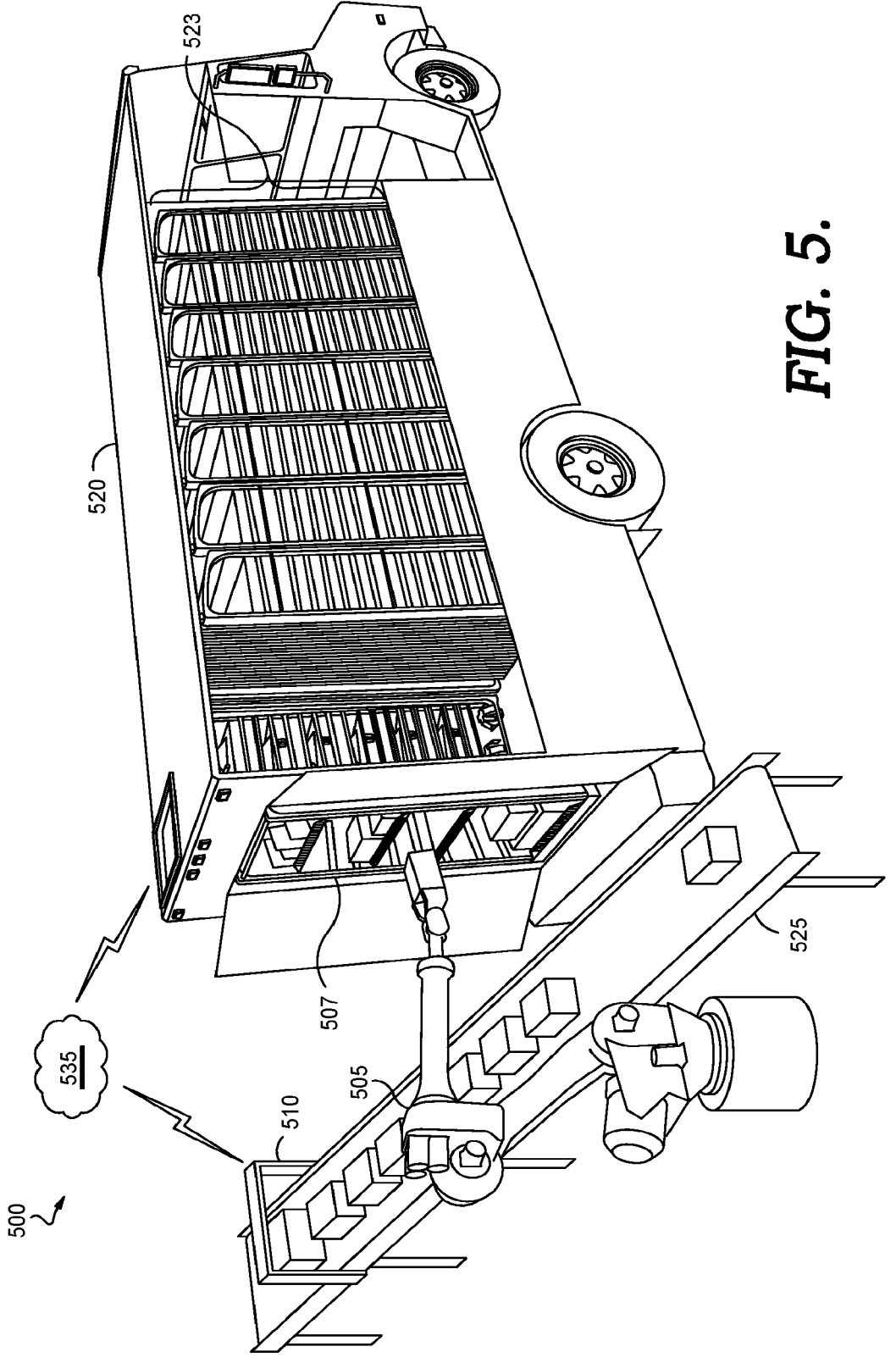

FIG. 5 is a schematic diagram of an environment illustrating how one or more assets are loaded into storage units inside a logistics vehicle, according to some embodiments.

Figure 6:
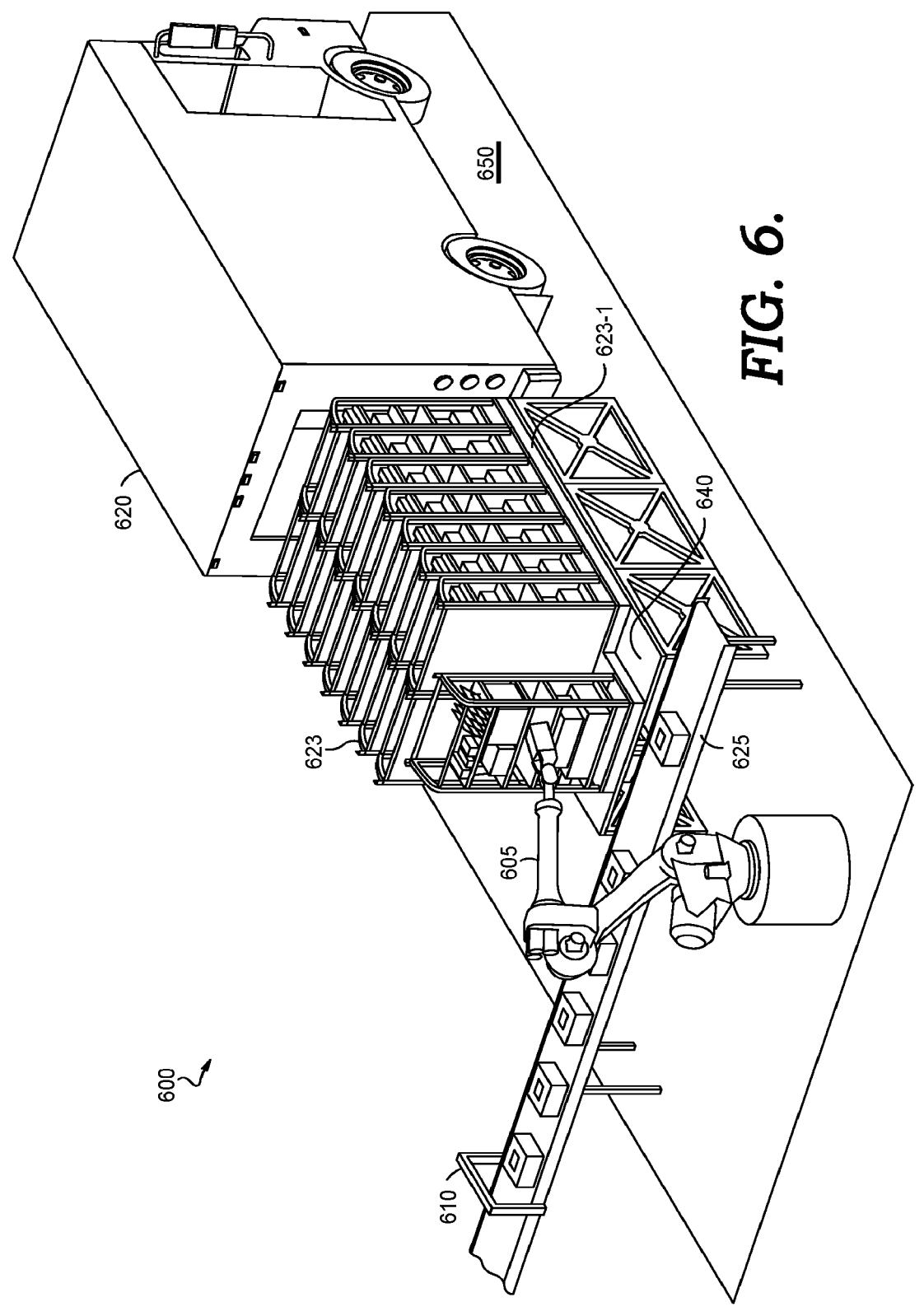

FIG. 6 is a schematic diagram of an environment illustrating how one or more assets are loaded into storage units that are outside of a logistics vehicle, according to some embodiments.

Figure 7:
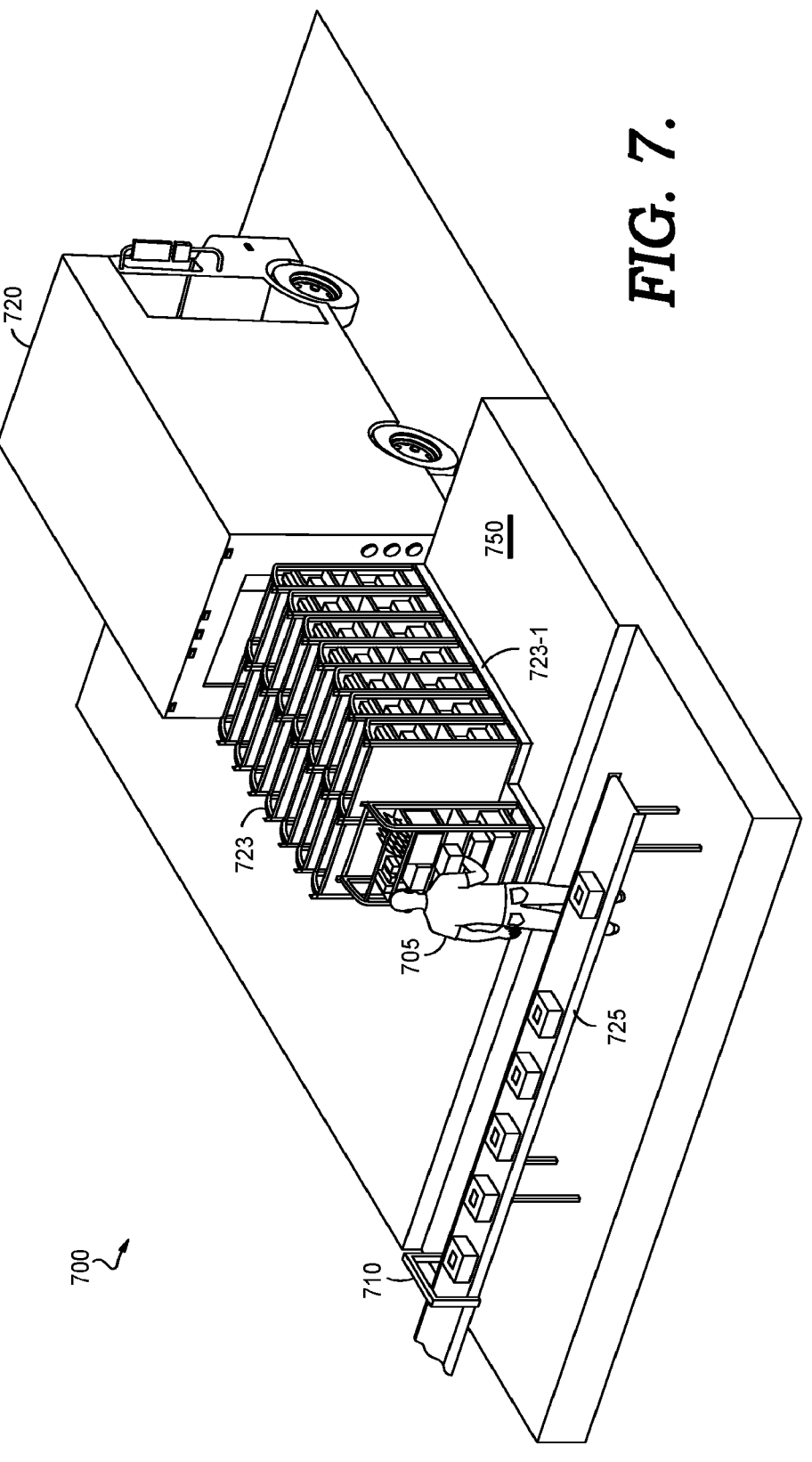

FIG. 7 is a schematic diagram of an environment illustrating how one or more assets are loaded into storage units that are outside of a logistics vehicle, according to some embodiments.

Figure 8A:
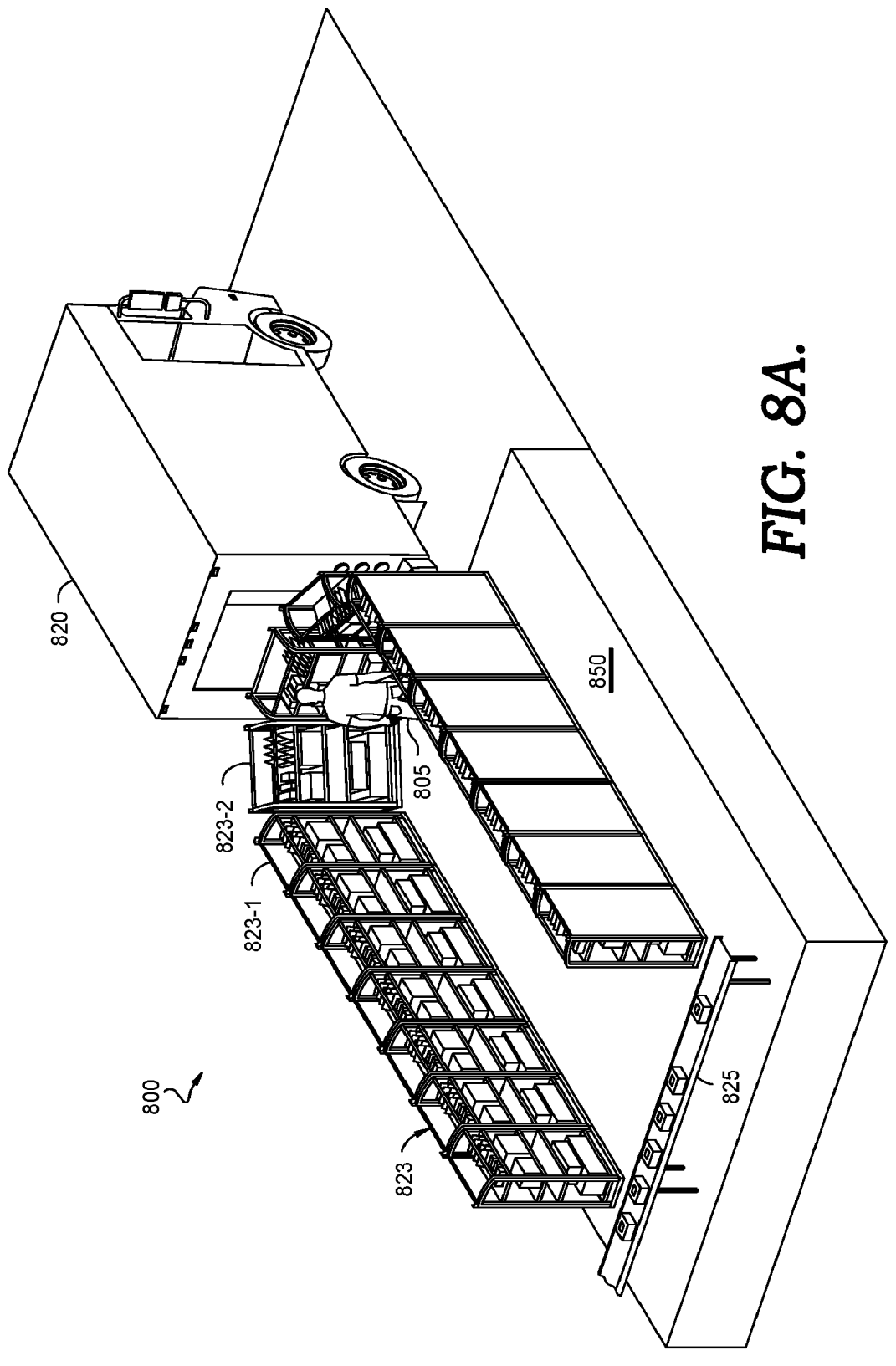

FIG. 8A is a schematic diagram of an environment illustrating how one or more assets are loaded into storage units that are configured to be adjusted into a U-shape, according to some embodiments.

Figure 8B:
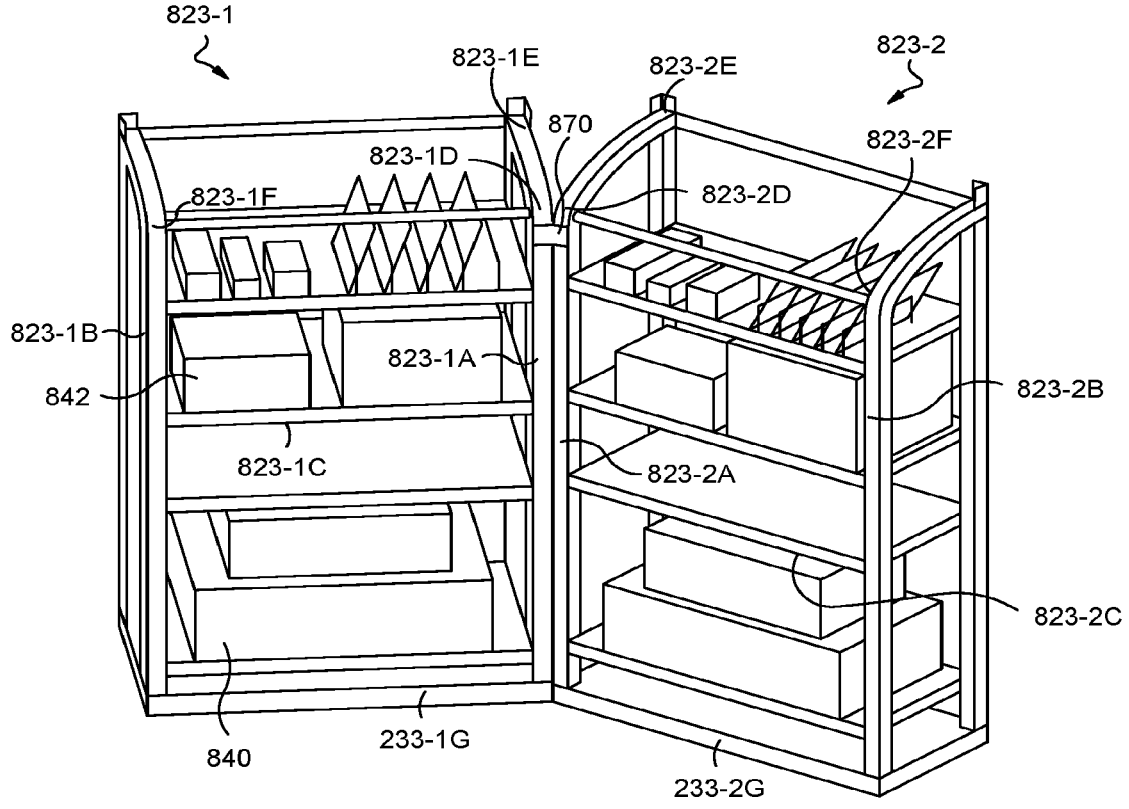

FIG. 8B is a schematic diagram illustrating how the individual storage units of FIG. 8A may be oriented and adjusted in order to contribute to the overall U-shape (or any other suitable shape) of the storage units, according to some embodiments.

Figures 8C, 8D:
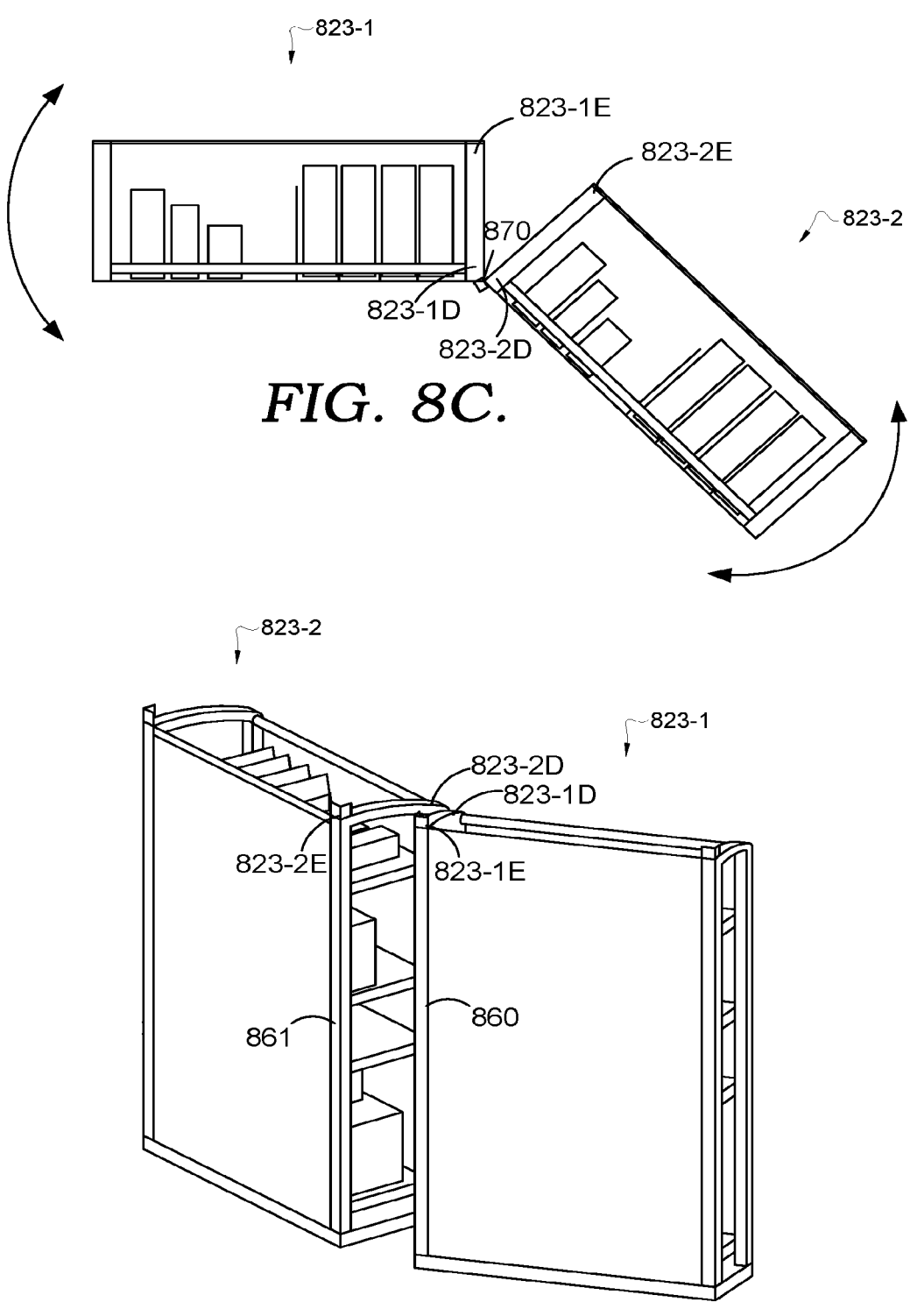

FIG. 8C is a top view of the storage units of FIG. 8B illustrating how individual storage units may be oriented and adjusted in order to contribute to the overall U-shape (or any other suitable shape) of the storage units.

FIG. 8D is a rear view of the storage units of FIG. 8B illustrating how individual storage units may be oriented and adjusted in order to contribute to the overall U-shape (or any other suitable shape) of the storage units, according to some embodiments.

Figure 9:
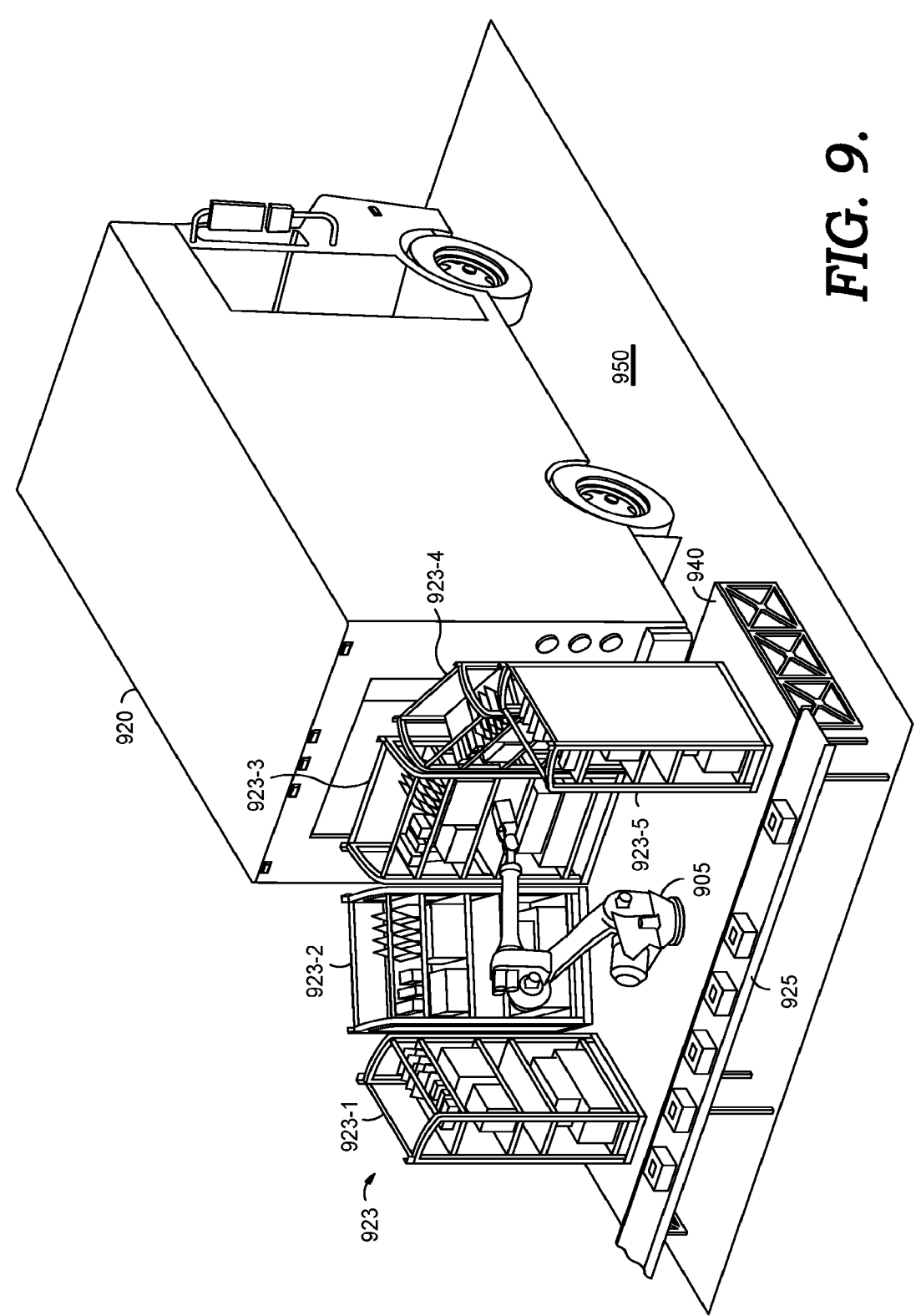

FIG. 9 is a schematic diagram of an environment illustrating how one or more assets are loaded into storage units that are configured to be adjusted into a semi-circle shape, according to some embodiments.

Figure 10:
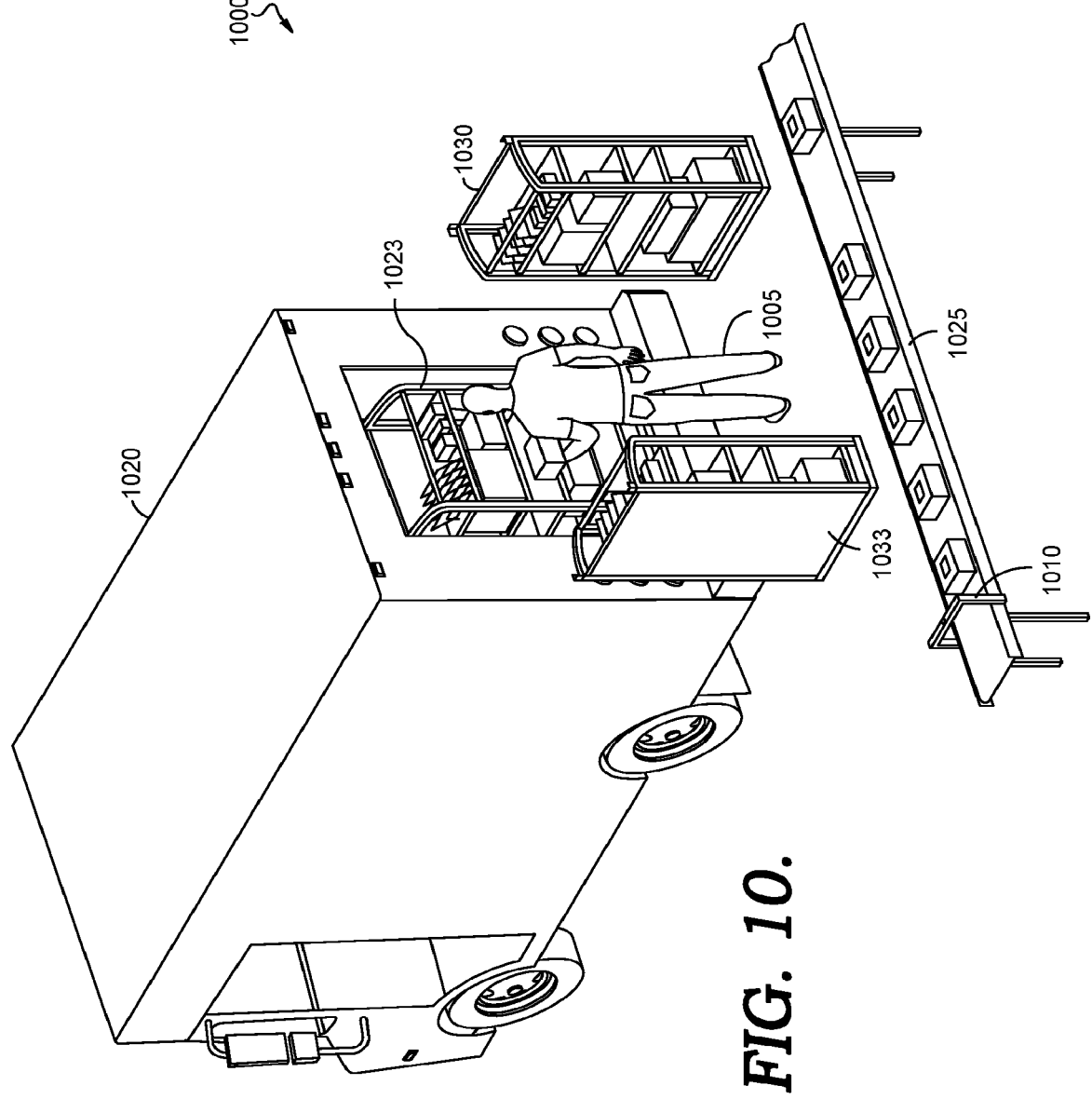

FIG. 10 is a schematic diagram of an environment illustrating how one or more buffer shelves are used for loading one or more assets, according to some embodiments.

Figure 11:
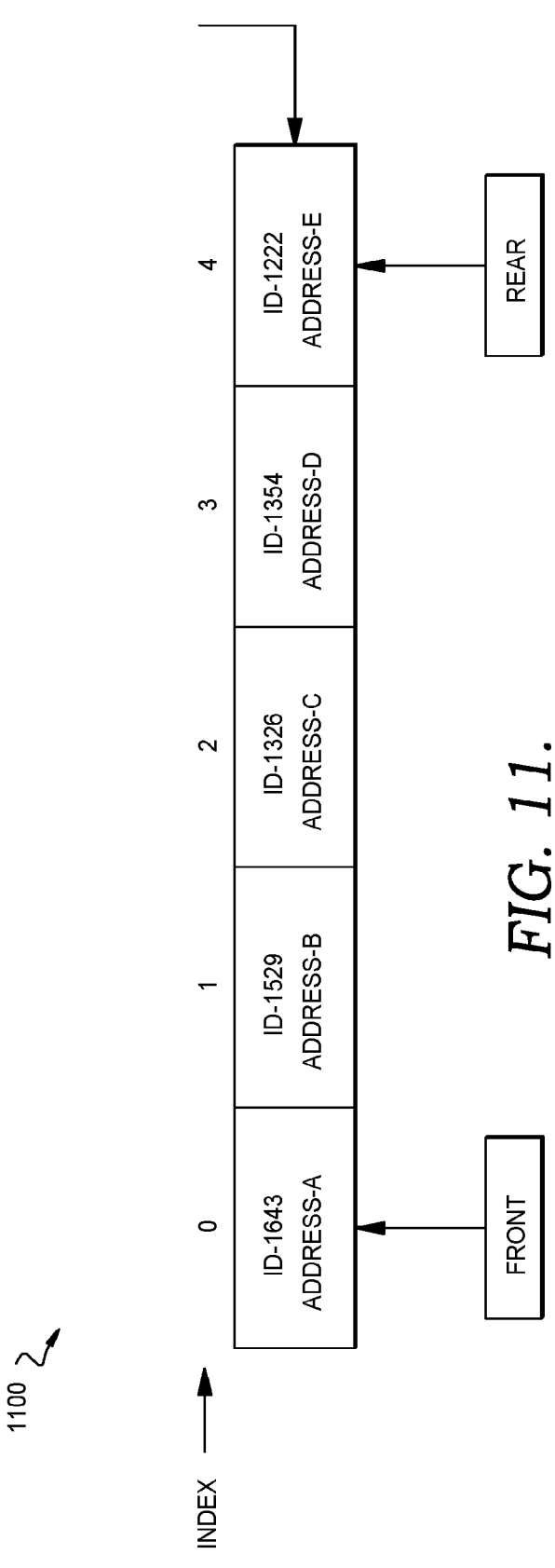

FIG. 11 is a block diagram of an example queue data structure illustrating how storage units can be rotated or shifted to a loading location, according to some embodiments.

Figure 12:
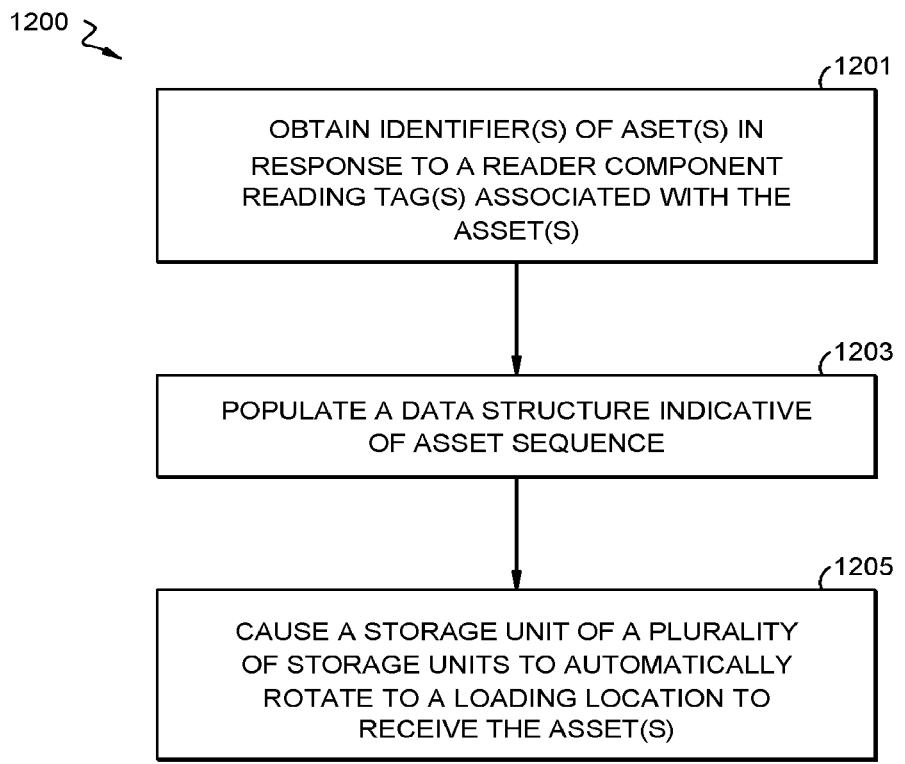

FIG. 12 is a flow diagram of an example process for causing a storage unit to rotate to a loading location to store one or more assets, according to some embodiments.

DETAILED DESCRIPTION OF THE INVENTION

The present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. Like numbers refer to like elements throughout.

I. OVERVIEW

As described above, existing technologies are static and include limited functionality. For example, existing conveyor belt assembly technologies use simple logic or computer-implemented conditional rules to activate/deactivate rotation of the belt or change speeds of the belt. However, no conveyor belt technologies are currently able to perform more dynamic operations, such as communicatively couple (e.g., via a wireless computer network) to other components to perform asset loading functionality. Various embodiments of the present disclosure improve conveyor belt technologies by communicatively coupling with other components, such as one or more logistics servers (e.g., cloud computing nodes, servers, etc.), logistics vehicles, and/or storage units that receive assets. In various instances, this communicative coupling allows for even further functionality that improves existing technologies. For example, a conveyor apparatus may include a reader component that reads each tag coupled to an asset as each asset traverses past the reader component and sends data located in the tag, over a computer network, to one or more logistics servers, logistics vehicles, and/or storage units so that the one or more storage units can automatically rotate to a loading location (e.g., the back of a vehicle where an operator is standing) responsive to receiving and analyzing the tag data for each asset. In this way, for example, embodiments can anticipate a sequence of assets as the assets move, on a conveyor apparatus, towards a loading operator's position and responsively and automatically shift or rotate the storage units in advance such that by the time each asset is picked from the conveyor apparatus, the corresponding storage unit is already positioned to the loading location. A particular storage unit may be needed for various reasons or asset attributes (e.g., asset size, destination location, dimensions, etc.). For example, various assets may be grouped together by zip code, destination location, geocode, or the like so that when the assets are unloaded, each asset can be physically near each other in shelving units. Accordingly, each asset may have a corresponding storage unit it will be stored to and the corresponding storage units may automatically rotate to a loading location based on asset attributes or identifiers and the sequence it is read in by the reading component.

Existing shelving unit technologies either contain no computer logic for automated movement or move based on manual user selections. For example, existing shelving unit technologies may include a physical label that human operators read so that they can associate information on an asset with the label. This may require arduous labor by the human operator such as manually rotating or otherwise moving shelving units so that the operator can place the asset in the correct shelving location. This may further require the human operator to extensively orient herself or otherwise move in various locations to get to the correct shelving location. In another example, shelving unit technologies may require the user to manually input information on a computer. For instance, a shelving unit or other device may include a key pad that prompts a user to manually type in asset data. After the user inputs this information, the user may then have to manually find the correct location. Various embodiments improve these existing shelving unit technologies by automatically rotating particular storage units to a loading location at least partially in response to receiving a communication from a conveyor apparatus or one or more other computing devices (e.g., a logistics server). This communication may include information, such as destination address information or other identifiers on an asset, which is used by the storage unit system to locate the particular storage unit and rotate it to the particular loading location so that the user or operator can easily place the asset in the unit without orienting or otherwise causing unnecessary movement, either with respect to the storage units themselves or orienting her body.

Additional embodiments described herein improve existing shelving unit technologies by including storage units that comprise one or more fastening mechanisms or components that cause a fixed axis to be formed between an anterior or front portion of the storage units (e.g., but not a back portion of the storage units) such that each storage unit can be coupled together and swing or pivot about the axis in an inward or outward fashion, as described, for example, with respect to FIGS. 8A through 8D. In this way, a plurality of storage units together are flexible such that they can take on a particular orientation or shape (e.g., a U-shape or semi-circle) for access during asset loading and for being able to fit within a logistics vehicle.

Generally, existing asset loading system technologies require extensive manual human input, with limited functionality as described herein. Various embodiments of the present disclosure improve these existing asset loading system technologies by performing new functionality that no asset loading technologies or humans have performed before (e.g., via the new conveyor apparatus functionality or storage unit functionality described above). For instance, some embodiments improve these technologies by automating various processes (e.g., automatically rotating a storage unit to a loading location) based on one or more rules (e.g., receiving an identifier identifying asset attributes, such as destination and size). As described herein, humans themselves and static technology, especially in the shipping industry, have historically required extensive manual intervention to load assets. However, both conventional techniques and existing technology in the shipping industry have not performed the new and improved functionality as described herein. For example, each of the FIGS. 4A through 12 describe functionality that improves existing asset loading system technology and conventional techniques used in the shipping industry.

In is understood that although this overview section describes various improvements to conventional solutions and technologies, these are by way of example only. As such, other improvements are described below or will become evident through description of various embodiments. This overview is provided to introduce a selection of concepts in a simplified form that are further described below in the detailed description. This overview is not intended to: identify key features or essential features of the claimed subject matter, key improvements, nor is it intended to be used in isolation as an aid in determining the scope of the claimed subject matter.

II. APPARATUSES, METHODS, AND SYSTEMS

Embodiments of the present disclosure may be implemented in various ways, including as apparatuses that comprise articles of manufacture. An apparatus may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices/entities, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

FIG. 1 is a schematic diagram of an example computing environment 100 in which aspects of the present disclosure are employed, according to some embodiments. As shown in FIG. 1, this particular computing environment 100 includes one or more logistics vehicles 120, one or more logistics servers 105, one or more computing entities 110 (e.g., a mobile device, such as a DIAD), one or more satellites (not shown), one or more networks 135, a plurality of storage units 123, and a conveyor apparatus 125. Each of these components, entities, devices, systems, and similar words used herein interchangeably may be in direct or indirect communication with, for example, one another over the same or different wired and/or wireless networks. Additionally, while FIG. 1 illustrates the various system entities as separate, standalone entities, the various embodiments are not limited to this particular architecture.

In various embodiments, the network(s) 135 represents or includes an IoT (internet of things) or IoE (internet of everything) network, which is a network of interconnected items (e.g., the storage units 123 and the conveyor apparatus 125) that are each provided with unique identifiers (e.g., UIDs) and computing logic so as to communicate or transfer data with each other or other components. Such communication can happen without requiring human-to-human or human-to-computer interaction. For example, an IoT network may include the logistics vehicle 120, which is equipped with one or more sensors and transmitters in order to process and/or transmit sensor data over the network 135 to the logistics server(s) 105, the storage units 123, and/or the conveyor apparatus. In the context of an IoT network, a computer (not shown) within the logistics vehicle 120 (or any of the other components) can be or include one or more local processing devices (e.g., edge nodes) that are one or more computing devices configured to store and process, over the network(s) 135, either a subset or all of the received or respective sets of data to the one or more remote computing devices (e.g., the computing entities 110 and/or the logistics server(s) 105) for analysis.

In some embodiments, the local processing device(s) described above is a mesh or other network of microdata centers or edge nodes that process and store local data received from sensors coupled to the storage units 123, conveyor apparatus 125, and/or the logistics vehicle 120 and push or transmit some or all of the data to a cloud device or a corporate data center that is or is included in the one or more logistics server(s) 105. In some embodiments, the local processing device(s) stores all of the data and only transmits selected (e.g., data that meets a threshold) or important data to the one or more logistics servers 105. Accordingly, the non-important data or the data that is in a group that does not meet a threshold is not transmitted. For example, the conveyor apparatus 125 may interrogate a tag on a parcel to receive data but only push a portion of the received data. Accordingly, only after the condition or threshold has been met does the local processing device(s) transmit the data that meets or exceeds the threshold to remote computing devices such that the remote device(s) can take responsive actions, such as notify a user mobile device (e.g., computing entity 110) indicating the threshold has been met and/or cause a modification of data (e.g., consolidate entries of purchase orders). The data that does not meet or exceed the threshold is not transmitted in particular embodiments. In various embodiments where the threshold or condition is not met, daily or other time period reports are periodically generated and transmitted from the local processing device(s) to the remote device(s) indicating all the data readings gathered and processed at the local processing device(s). In some embodiments, the one or more local processing devices act as a buffer or gateway between the network(s) and a broader network, such as the one or more networks 135. Accordingly, in these embodiments, the one or more local processing devices can be associated with one or more gateway devices that translate proprietary communication protocols into other protocols, such as internet protocols.

1. Exemplary Analysis Computing Entities

FIG. 2 provides a schematic of a logistics server(s) 105 according to particular embodiments of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, consoles input terminals, servers or server networks, blades, gateways, switches, processing devices, processing entities, set-top boxes, relays, routers, network access points, base stations, cloud computing nodes, virtual machines, virtual containers, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In particular embodiments, these functions, operations, and/or processes can be performed on data, content, information/data, and/or similar terms used herein interchangeably.

As indicated, in particular embodiments, the logistics server(s) 105 may also include one or more communications interfaces 220 for communicating with various computing entities, such as by communicating data, content, information/data, and/or similar terms used herein interchangeably that can be transmitted, received, operated on, processed, displayed, stored, and/or the like.

As shown in FIG. 2, in particular embodiments, the logistics server(s) 105 may include or be in communication with one or more processing elements 205 (also referred to as processors, processing circuitry, and/or similar terms used herein interchangeably) that communicate with other elements within the logistics server(s) 105 via a bus, for example. As will be understood, the processing element 205 may be embodied in a number of different ways. For example, the processing element 205 may be embodied as one or more complex programmable logic devices (CPLDs), microprocessors, multi-core processors, co-processing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In particular embodiments, the logistics server(s) 105 may further include or be in communication with non-volatile media (also referred to as non-volatile storage, memory, memory storage, memory circuitry and/or similar terms used herein interchangeably). In particular embodiments, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases (e.g., parcel/item/shipment database), database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In particular embodiments, the logistics server(s) 105 may further include or be in communication with volatile media (also referred to as volatile storage, memory, memory storage, memory circuitry and/or similar terms used herein interchangeably). In particular embodiments, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the logistics server(s) 105 with the assistance of the processing element 205 and operating system.

As indicated, in particular embodiments, the logistics server(s) 105 may also include one or more communications interfaces 220 for communicating with various computing entities, such as by communicating information/data, content, information/data, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the logistics server(s) 105 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, long range low power (LoRa), LTE Cat M1, NarrowBand IoT (NB IoT), and/or any other wireless protocol.

Although not shown, the logistics server(s) 105 may include or be in communication with one or more input elements, such as a keyboard input, a mouse input, a touch screen/display input, motion input, movement input, audio input, pointing device input, joystick input, keypad input, and/or the like. The logistics server(s) 105 may also include or be in communication with one or more output elements (not shown), such as audio output, video output, screen/display output, motion output, movement output, and/or the like.

As will be appreciated, one or more of the logistics server(s)'s 105 components may be located remotely from other logistics server(s) 105 components, such as in a distributed system (e.g., a cloud computing system). Additionally or alternatively, the logistics server(s) 105 may be represented among a plurality of logistics servers. For example, the logistics server(s) 105 can be or be included in a cloud computing environment, which includes a network-based, distributed/data processing system that provides one or more cloud computing services. Further, a cloud computing environment can include many computers, hundreds or thousands of them or more, disposed within one or more data centers and configured to share resources over the network(s) 135. Furthermore, one or more of the components may be combined and additional components performing functions described herein may be included in the logistics server(s) 105. Thus, the logistics server(s) 105 can be adapted to accommodate a variety of needs and circumstances. As will be recognized, these architectures and descriptions are provided for exemplary purposes only and are not limiting to the various embodiments.

2. Exemplary Computing Entities

Computing entities 110 may be configured for: reading tag data from an asset that traverses the conveyor apparatus and transmitting the data, causing automatic rotation of one of the storage units 123 to a loading location, processing one or more shipping requests, monitoring shipments, and/or operation by a user (e.g., a vehicle operator, delivery personnel, customer, and/or the like). In some embodiments, a computing entity 110 is embedded within or otherwise coupled to the storage units 123, the logistics vehicle 120, and/or conveyor apparatus 125 so that these components may perform their suitable functionality as described herein. In certain embodiments, computing entities 110 may be embodied as handheld computing entities, such as mobile phones, tablets, personal digital assistants, and/or the like, that may be operated at least in part based on user input received from a user via an input mechanism. Moreover, computing entities 110 may be embodied as onboard vehicle computing entities, such as central vehicle electronic control units (ECUs), onboard multimedia system, and/or the like that may be operated at least in part based on user input. Such onboard vehicle computing entities may be configured for autonomous and/or nearly autonomous operation however, as they may be embodied as onboard control systems for autonomous or semi-autonomous vehicles, such as unmanned aerial vehicles (UAVs), robots, and/or the like. As a specific example, computing entities 110 may be utilized as onboard controllers for UAVs configured for picking-up and/or delivering packages to various locations, and accordingly such computing entities 110 may be configured to monitor various inputs (e.g., from various sensors) and generate various outputs. It should be understood that various embodiments of the present disclosure may comprise a plurality of computing entities 110 embodied in one or more forms (e.g., parcel security devices kiosks, mobile devices, watches, laptops, carrier personnel devices (e.g., Delivery Information Acquisition Devices (DIAD)), etc.).

As will be recognized, a user may be an individual, a family, a company, an organization, an entity, a department within an organization, a representative of an organization and/or person, and/or the like—whether or not associated with a carrier. In particular embodiments, a user may operate a computing entity 110 that may include one or more components that are functionally similar to those of the logistics server(s) 105. FIG. 3 provides an illustrative schematic representative of a computing entity 110 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, vehicle multimedia systems, autonomous vehicle onboard control systems, watches, glasses, key fobs, radio frequency identification (RFID) tags/readers, ear pieces, scanners, imaging devices/cameras (e.g., part of a multi-view image capture system), wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Computing entities 110 can be operated by various parties, including carrier personnel (sorters, operators, delivery drivers, network administrators, and/or the like). As shown in FIG. 3, the computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provide signals to and receive signals from the transmitter 304 and receiver 306, respectively. In some embodiments, the computing entity 110 includes one or more sensors 330 (e.g., a tag reader). In some embodiments, at least one of the computing entities 110 is coupled to the logistics vehicle 120. The one or more sensors 330 can be one or more of: a pressure sensor, an accelerometer, a gyroscope, a geolocation sensor (e.g., GPS sensor), a radar, a lidar, sonar, ultrasound, an object recognition camera, and any other suitable sensor used to detect objects or obtain information in a geographical environment that the logistics vehicle 120 is within.

The signals provided to and received from the transmitter 304 and the receiver 306, respectively, may include signaling information in accordance with air interface standards of applicable wireless systems. In this regard, the computing entity 110 may be capable of operating with one or more air interface standards, communication protocols, modulation types, and access types. More particularly, the computing entity 110 may operate in accordance with any of a number of wireless communication standards and protocols, such as those described above with regard to the logistics server(s) 105. In a particular embodiment, the computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the computing entity 110 may operate in accordance with multiple wired communication standards and protocols, such as those described above with regard to the logistics server(s) 105 via a network interface 320.

Via these communication standards and protocols, the computing entity 110 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 110 can also download changes, add-ons, and updates, for instance, to its firmware, software (e.g., including executable instructions, applications, program modules), and operating system.

According to particular embodiments, the computing entity 110 may include location determining aspects, devices, modules, functionalities, and/or similar words used herein interchangeably. For example, the computing entity 110 may include outdoor positioning aspects, such as a location module adapted to acquire, for example, latitude, longitude, altitude, geocode, course, direction, heading, speed, universal time (UTC), date, and/or various other information/data. In particular embodiments, the location module can acquire information/data, sometimes known as ephemeris information/data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the computing entity's 110 position in connection with a variety of other systems, including cellular towers, Wi-Fi access points, and/or the like. Similarly, the computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices/entities (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the computing entity 110 to interact with and/or cause display of information from the logistics server(s) 105, as described herein. The user input interface can comprise any of a number of devices or interfaces allowing the computing entity 110 to receive information/data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

As shown in FIG. 3, the computing entity 110 may also include a camera, imaging device, and/or similar words used herein interchangeably 326 (e.g., still-image camera, video camera, IoT enabled camera, IoT module with a low resolution camera, a wireless enabled MCU, and/or the like) configured to capture images. The computing entity 110 may be configured to capture images via the onboard camera 326, and to store those imaging devices/cameras locally, such as in the volatile memory 322 and/or non-volatile memory 324. As discussed herein, the computing entity 110 may be further configured to match the captured image data with relevant location and/or time information captured via the location determining aspects to provide contextual information/data, such as a time-stamp, date-stamp, location-stamp, and/or the like to the image data reflective of the time, date, and/or location at which the image data was captured via the camera 326. The contextual data may be stored as a portion of the image (such that a visual representation of the image data includes the contextual data) and/or may be stored as metadata (e.g., data that describes other data, such as describing a payload) associated with the image data that may be accessible to various computing entities 110.

The computing entity 110 may include other input mechanisms, such as scanners (e.g., barcode scanners), microphones, accelerometers, RFID readers (or Near-Field Communication (NFC) readers), and/or the like configured to capture and store various information types for the computing entity 110. For example, a scanner may be used to capture parcel/item/shipment information/data from an item indicator disposed on a surface of a shipment or other item. In certain embodiments, the computing entity 110 may be configured to associate any captured input information/data, for example, via the onboard processing element 308. For example, scan data captured via a scanner may be associated with image data captured via the camera 326 such that the scan data is provided as contextual data associated with the image data.

The computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the computing entity 110. As indicated, this may include a user application that is resident on the entity or accessible through a browser or other user interface for communicating with the logistics server(s) 105 and/or various other computing entities.

In another embodiment, the computing entity 110 may include one or more components or functionality that are the same or similar to those of the logistics server(s) 105, as described in greater detail above. As will be recognized, these architectures and descriptions are provided for exemplary purposes only and are not limiting to the various embodiments.

FIG. 4A is a schematic diagram of an environment 400 illustrating how one or more assets are loaded into storage units inside a logistics vehicle, according to some embodiments. The environment 400 includes a conveyor apparatus 425 that includes the reader component 410 and an operator 405 that loads assets into one or more of the storage units 423, which are located within the logistics vehicle 420. The environment 400 also illustrates that the conveyor apparatus 425 is communicatively coupled to the logistics vehicle 420 and/or the storage units 423 via the network 435. In some embodiments, the logistics vehicle 420 represents the logistics vehicle 120 and vice versa, the conveyor apparatus 425 represents the conveyor apparatus 125 and vice versa, the storage units 423 represent the storage units 123 and vice versa, and/or the network(s) 435 represents the network(s) 135.

A "logistics vehicle" as described herein is any suitable vehicle (e.g., an airplane, freight ship, carrier van, drone, UMV or autonomous car, etc.) that performs or is associated with any suitable logistics or shipping operation. A "shipping operation" as described herein is any suitable operation related to shipping, such as a final mile delivery of assets (i.e., delivering assets to final destination location), delivering assets from one sorting facility to another, delivering assets from a carrier store to a sorting facility, importing or exporting assets, flying or otherwise carrying assets to/away from a sorting facility, etc. An "asset" as described herein is any tangible item that is transported from one location to another. Assets may be or include the contents that enclose products or other items people wish to ship. For example, an asset may be or include a parcel or group of parcels, a package or group of packages, a box, a crate, a drum, a container, a box strapped to a pallet, a bag of small items, and/or the like.

Logistics vehicles may be configured to house or receive storage units for the storage of assets. A "storage unit" as described herein is any tangible area or enclosure that is configured to store or receive one or more assets. For example, a storage unit can be or include: one or more shelf slots, one or more containers, a locker bank, a cage, one or more cubbies, one or more drawers, and/or any other partial or full enclosure that receives assets.

In some embodiments, the logistics vehicle 420 and/or the storage units 423 anticipate the asset traversing sequence as they move toward the operator 405's position and shifts or rotates the storage units 423 in advance such that by the time an asset is picked from the conveyor apparatus 425, the particular corresponding storage unit positions (or is already positioned) at the appropriate loading location 407. A "loading location" as described herein is any suitable location for loading one or more assets onto a respective storage unit. The loading location may be at or close to an area where an operator or other loading mechanisms (e.g., a robotic arm component) performs the loading operations. For example, the loading location may be at the rear of the logistics vehicle 420 (as illustrated in FIG. 4A), on the side of the logistics vehicle 420, and/or on the rear wall inside of a cab of the logistics vehicle 420 such that a driver can load parcels just before engaging in driving, for example.

The environment 400 illustrates that the conveyor apparatus 425 and the logistics vehicle 420 (and/or the storage units 423) are communicatively coupled. In some embodiments, a "conveyor apparatus" as described herein includes any suitable conveyor belt assembly that includes a conveyor belt (continuous medium that carries assets from one location to another) one or more rollers or idlers that rotate the belt or rotate such that assets are moved, and/or one or more pulleys (e.g., located on the ends of the conveyor apparatus 425) that transmit drive power into the belt. A conveyor apparatus, however, need not require a "belt" but can use rollers or other mechanisms to move assets. In some embodiments, "communicatively coupled" means that two or more components can perform data transportation between each other via a wired (e.g., ethernet or fiber-optic medium connected in a LAN) or wireless (e.g., IEEE 802.15.4) computer protocol network. The conveyor apparatus 425 includes a rotating component 425-1 (e.g., a belt or set of rollers) that is configured to cause movement of one or more assets for loading the one or more assets. Each time the rotating component 425-1 causes movement of an asset past the reader component 410, the reader component 410 reads the tag of each asset (e.g., assets 449, 447, and 445), which is then transmitted over the network 435.

By being communicatively coupled, the conveyor apparatus 425, the logistics server(s) 105, the logistics vehicle 420, and/or the storage units 423 can share the sequence of assets that are traversing down the conveyor apparatus 425 (via the rotating component 425-1) based on the reader component 410 reading data from one or more tags located on each asset and sharing the information, via the network 435, with the logistics vehicle 420, the logistics server 105, and/or the storage units 423. For example, the sequence of assets can include the asset 449 (already read by the reader component 410 first), the next in-line asset 447 (read by the reader component 410 after it read the asset 449), and the asset 445 currently being read by the reader component 410. Thus the sequence may be populated in a data structure, such as a queue, indicating the sequence of assets 449, 447, and 445. This may be indicative of the order that assets need to be loaded. In this way, the storage units 423 can rotate a corresponding storage unit to the loading location based on the next-in-line asset and/or identifiers located on the tag (e.g., destination address or dimensions of the corresponding asset). In an illustrative example, in response to the first asset 449 being read by the reader component 410 (e.g., because a belt (e.g., the rotating component 425-1) of the conveyor apparatus 425 has moved the asset 449 under the reader component 410) the reader component 410 may communicate, via the network 435, with the storage units 423, which causes a control signal to be sent so that a first storage unit can be rotated to the loading location 407. The operator 405 may then load the asset 449 into the first storage unit at the loading location 407. Likewise, at least partially in response to the reader component 410 reading the second asset 447 (e.g., because the belt of the conveyor apparatus 425 has moved the asset 447 under the reader component 410), the reader component 410 may communicate, via the network 435, with the storage units 323, which causes another control signal to be sent to a second storage unit such that the second storage unit can take the place of the first storage unit (i.e., move to the loading location 407). The operator 405 can then load the second asset 447 into the second storage unit at the loading location 407. This process can be repeated for the third asset 445 (and all other assets traversing in a sequence down the conveyor apparatus 42), such that a third storage unit is rotated to the loading location 407, taking the place of the second storage unit so that the operator 405 can load the third asset 445 into the third storage unit at the loading location 407. In this way, as the conveyor apparatus 425 moves each asset downstream past the reader component 410, the reader component 410 (or other component) can transmit an identifier identifying each asset such that the logistics server(s) 105, the logistics vehicle 420, and/or the storage units 423 can store the sequence of assets being read so that the storage units 423 can rotate the correct storage unit to the loading location based on the particular sequence order that the assets were read in and identifier data located in each tag coupled to each asset.

In some embodiments, the storage units 423 (or any of the storage units described herein) rotate individual storage units to the location by shifting storage units (also called storage structures) within a storage space in order to facilitate efficient staging and/or retrieval of assets or parcels. Examples of this are described in U.S. application Ser. No. 16/557,573 titled "Systems, methods, and apparatuses for shifting and staging storage structures and parcels thereon," filed on Aug. 30, 2019, the contents of which are incorporated by reference in its entirety.

FIG. 4A illustrates at least in part, the eased burden the operator 405 faces relative to prior solutions in the shipping industry. For example, the operator 405 need not walk into the logistics vehicle 420. In prior solutions, a logistics vehicle may include shelving units along the walls of the logistics vehicle and an operator would have to physically step up into the logistics vehicle and find the correct loading location for a particular asset (e.g., based on manually matching information on a label of an asset with information located on the shelving unit). However, embodiments improve these loading systems because, instead of moving around the logistics vehicle 420, the operator 405 may stand at the loading location 407 and place the asset in the particular storage unit at the particular loading location 407 since the storage units 423 automatically rotate to the loading location 407 as described above. In this way, the particular storage unit moves to where the operator 405 is, as opposed to the operator 405 having to move where the correct storage unit is.

In some embodiments, the storage units 423 can be accessed from any suitable loading location associated with the logistics vehicle 420. For example, in some embodiments, the storage units 423 can be accessed from the side, front (rear wall of the cab), or rear of the logistics vehicle 420. In some embodiments, panels (not shown) can cover the loading locations during the storage unit shuffle cycle as part of an in-car mechanism.

In some embodiments, the storage units 423 may not rotate to the loading location 407 fast enough (or they are rotating too fast) for the operator 405. In these embodiments, the operator 405 can wait or double handle the asset (i.e., pick the asset from the conveyor apparatus 425, leave the asset in a buffer storage unit (described below), and push the asset from the buffer storage unit to the appropriate storage unit of the storage units 423 at a later time).

FIG. 4B is a more detailed view of the reader component 410 of FIG. 4A, according to particular embodiments. Although FIG. 4B illustrates the reader component 410 of FIG. 4A, FIG. 4B may be any reading component described herein with regard to several embodiments. FIG. 4B includes the conveyor apparatus 425, the reader component 410, and the assets 445 and 447. FIG. 4B illustrates the reader component 410 reading a tag 440 of the asset 445 in response to the conveyor apparatus 525 causing the asset 445 to move past the reader 410-2. As illustrated, the reader component 410 is coupled to or a part of the conveyor apparatus 425, with the reader 410-2 specifically being oriented in a position higher than the surface of the conveyor apparatus 425 so that the reader 410-2 can read each tag of each asset. Although the reader component 410 is illustrated as being attached or a part of the conveyor apparatus 425, it is understood that the reader component 410 or any other component that reads tags does not have to be attached to a conveyor apparatus and can be oriented in any suitable position (e.g., on a ceiling or be standalone) and can take on any suitable form (e.g., a sphere or triangle) or any other configuration besides what is illustrated in FIG. 4B.

The reader 410-2 reads the tag 440 that is coupled to the asset 445 and transmits, via the transmitter 410-3 and the network 435, the identifier(s) or value(s) located in the tag 440 to the logistics server 105, the logistics vehicle 420, and/or the storage units 423, which causes a control signal to be transmitted to the storage units 423 to rotate a corresponding storage unit to the loading location 407 based on the data in the tag 440. Put another way, for example, a control signal can be sent to the storage units 423 causing the appropriate storage unit to be rotated to the loading location 407 based on the "destination," "size" of the asset 445, and/or "type" of asset 445. For example, the storage units 423 may include irregular shaped or different shaped storage units, some of which are each configured to store assets of differing sizes or weights, for example. Accordingly, for instance, if the asset 445 was considered a "small" asset, the storage units 423 may include a first storage unit configured to store smalls. Accordingly, in response to the reader 410-2 reading the tag 440, the first storage unit may be rotated to the loading location 407 to match the storage unit storage size capacity to the size of the asset.

Although the tag 440 includes specific identifiers and values, such as destination (e.g., address where asset is delivered to), size (e.g., weight or dimensions), and type (e.g., smalls, drum, box), it is understood that this is representative and that any identifier or values associated with a corresponding asset can alternatively or additionally be stored to any tag and be used to rotate a corresponding storage unit to the loading location based on the identifier data. For example, the tag 440 may alternatively or additionally include other attributes or identifiers, such as: shipper name, fragileness of the asset, the level of security associated with the asset (e.g., high security assets may be kept in a safe container of the plurality of storage units 423), indications of whether shipment is expedited, zip code, whether asset is domestic or foreign, etc. Some or each of these identifiers can be used to rotate an appropriate storage unit to the loading location 407 (or any other loading location described herein). For example, if the tag 440 has an identifier indicating that the corresponding asset 445 is "fragile," the storage units 423 may include a specialized storage unit that include fasteners (e.g., hook and loop fasteners) that are configured to hold fragile assets in place so that they do not rattle or otherwise move so that there is no breakage of the contents of the asset. In this way, for example, in response to the reader 410-2 reading the "fragile" identifier within the tag 440, a control signal may be sent to the storage units 423, which causes the storage unit with the fasteners to be rotated to the loading location 407 so that the operator 405 may not only load the "fragile" asset 445 into the correct storage unit, but the operator 405 may place the fasteners over the asset 445 so that the asset 445 stays substantially stationary. It is understood that some or each of the identifiers in the tag 440 can be used to cause a storage unit to rotate to the loading location. For example, each identifier may take on a certain weight or importance such that a linear combination score or calculation may be done to determine the final vote for a storage unit. In these instances, some identifiers (e.g., weight and size) may be more indicative of requiring a particular storage unit, whereas other identifiers (e.g., fragileness) may be more important and indicative of requiring a second storage unit. However, the other identifiers may be weighted higher or important for voting on a particular storage unit to load the asset to. Accordingly, the second storage unit may win the vote or be chosen as the storage unit to be rotated to the loading location, as opposed to the first storage unit because an asset is fragile (more important) notwithstanding that other storage units may be a better fit for the particular-sized asset.

In some embodiments, the transmitter 410-3 alternatively or additionally represents a receiver or transceiver in order to receive feedback (e.g., from the logistic server(s) 105, the storage units 423, and/or the logistics vehicle 420) to cause modification of the conveyor apparatus 425 in some way. For example, such modification may include an automatic control signal to slow down or stop the conveyor apparatus 425 (e.g., because an imaging camera sensor containing object recognition algorithms senses the operator 405 moving slowly). In another example, the conveyor apparatus 425 may include a speaker (not shown) that provides auditory feedback to the operator 405 (e.g., an instruction to speed up, slow down, or notify the operator 405 of certain data located/not located in the tag 440).

In some embodiments the reader 410-2 and tag 440 (or any other reader/tag combination described herein) are RFID, NFC, or any other suitable combination of reader and/or tag devices equipped with antennas and the like. In some embodiments, each tag is passive, active, or semi-passive. One embodiment of an RFID tag may include an active RFID tag, which comprises at least one of the following: (1) an internal clock; (2) a memory; (3) a microprocessor; and (4) at least one input interface for connecting with sensors located in the reader component 410. Another embodiment of the RFID tag may be a passive RFID tag. Each RFID tag may communicate wirelessly with RFID interrogators or readers (e.g., the reader 410-2 of FIG. 4B) within a certain geographical range or signal strength threshold of each other.

It is understood that in particular embodiments, a "tag" and a "reader" are not limited to RFID, NFC, or similar technologies but may broadly include other embodiments where any data is read from any suitable medium by a computer-readable machine. For example, a "tag" may be or include a paper or other medium that includes a barcode, QR code, data matrix code, smart code, or other code or computer-readable indicia of identifiers. In these embodiments, any suitable associated machine reader can be used to read the code of identifiers, such as an electronic scanner (e.g., a bar code scanner). Accordingly, the reader 410-2 may represent an electronic scanner, QR code reader, NFC reader, or any variety of suitable readers.

FIG. 5 is a schematic diagram of an environment 500 illustrating how one or more assets are loaded into storage units inside a logistics vehicle, according to some embodiments. The environment 500 includes a conveyor apparatus 525 that includes the reader component 510 and a robotic component 505 (e.g., a robotic arm) that loads assets into one or more of the storage units 523, which are located within the logistics vehicle 520. The environment 500 also illustrates that the conveyor apparatus 525 is communicatively coupled to the logistics vehicle 520 and/or the storage units 523 via the network 535. In some embodiments, the logistics vehicle 520 represents the logistics vehicle 120 and vice versa, the conveyor apparatus 525 represents the conveyor apparatus 125 and vice versa, the storage units 523 represent the storage units 123 and vice versa, and/or the network(s) 535 represents the network(s) 135.

In some embodiments, each component of the environment 500 represents the corresponding component of the environment 400 of FIGS. 4A and/or 4B and all of the functionality described, except for the robotic component 505. That is, in some embodiments, the conveyor apparatus 525 may represent the conveyor apparatus 425, the reader component 510 may represent the reader component 410, the network 535 represents the network 435, the logistics vehicle 520 represents the logistics vehicle 420, the storage units 523 represent the same storage units 423, and the like. Accordingly, all functionality described above with respect to FIGS. 4A and 4B may be the same for FIG. 5, except for the robotic component 505.

FIG. 5 illustrates that a robotic component 505 may be used to load assets instead of a human operator (e.g., the operator 405 of FIG. 4A). The robotic component 505 may be any suitable special-purpose machine configured to move assets to the loading location 507 and into corresponding storage units. In some embodiments, robotic component 505 represents a robotic arm component that is configured to clasp assets (e.g., via pressure sensors) and move them to the loading location 507 (e.g., via actuators). For example, the robotic component 505 can be a robotic arm, such as a Cartesian robot, cylindrical robot, SCARA robot, articulated robot, anthropomorphic robot, a VEX robotic arm, etc. In some embodiments, the robotic component 505 can alternatively represent any suitable robotic mechanism or machine that is not a robotic arm. For example, the robotic component 505 can represent an unmanned autonomous vehicle (UAV), drone, or other robotic machine that has a platform (e.g., instead of an arm or fingers) or enclosure to receive assets and can use an actuator to push the assets to the appropriate storage unit at the loading location 507.

In some embodiments, the robotic component 505 (or any robotic component described herein) is equipped with one or more sensors (not shown) in order to detect presence of the assets on the conveyor apparatus 525 (or any conveyor apparatus) and/or determine where exactly to place assets at a loading location. For example, in some embodiments, a robotic component includes a camera that uses object detection or object recognition algorithms to detect that an asset is within a distance threshold. In response to this detection, it can clasp the nearest asset (or group of assets) within the distance threshold and place the asset in the storage unit at the loading location 507 using object detection (e.g., a bounding box that reads "storage unit" may be detected at the loading location 507). Alternatively or additionally, the robotic component includes a reader (e.g., a QR, RFID, NFC) that is configured to read a tag or other indicia on the asset such that in response to a read of the tag, the robotic component clasps or otherwise moves an asset to a loading location and into a storage unit. Alternatively or additionally, the robotic component includes a range finder sensor such that in response to the asset being read to be within a range threshold, the robotic component may clasp or otherwise move an asset to a loading location and into a storage unit. Alternatively or additionally, the robotic component includes a pressure sensor such that in response to the robotic component reading or experiencing a pressure over a threshold, it clasps or otherwise moves an asset to a loading location and into a storage unit.

In some embodiments, the robotic component 505 (or any other robotic component described herein) is equipped with a transmitter, receiver, or transceiver (not shown) in order to communicate with the other components within the environments 500 and/or 100 via the network 535 to modify its operations. For example, in response to the reader component 510 reading an asset, it can establish a connection with the robotic component 505 such that the robotic component 505 has information indicating the sequence in which assets are read to prepare for loading (e.g., to widen or narrow its clasping mechanism based on the size of a particular incoming asset) according to the sequence read. Alternatively or additionally, the storage units 523 can send, via a transmitter, a message to the robotic component 505 instructing the robotic component 505 to stop or otherwise slow its operations (e.g., because the rotating of the storage units 523 is taking too long or loading is occurring too fast). Alternatively or additionally, the logistics server(s) 105 or any other suitable component may notify the robotic component 505 that one or more assets were placed in a wrong storage unit or there has otherwise been a change in status for an associated asset (e.g., a change in destination address). The logistics server(s) 105 or other component may then cause the storage unit associated with the change in status to be moved to the loading location 507 and the logistics server(s) 105 or other component instruct the robotic component 505 to remove the asset. Responsively, a control signal may be sent to the storage units 523 to once again rotate an appropriate storage unit to the loading location 507 based on the status change. Responsively, the robotic component 505 may place the asset that was removed from the other storage unit to the new storage unit based on the status change.

FIG. 5 Illustrates that similar to a manual loading process by an operator, the robotic component 505 may be used to pick an asset and move it to the storage unit presented at the loading location 507. In embodiments, both the robotic component 505 and the storage units 523 work in sync such that the storage units 523 are responsible for rotating the correct individual storage unit to the loading location 507 based on the asset that the robotic component 505 is currently clasping or otherwise needs to load next. In embodiments, an asset sequence is read upstream by the reader component 510, which triggers both storage unit selection and robotic component 505 operation.

In an illustrative example of how the robotic component 505 works within the environment 500, the following is provided. The reader component 510 may first read a tag of an asset that has various identifiers (e.g., weight, dimensions, destination address). Responsively, the reader component 510 may communicate, via the network 535, with the logistics server(s) 105, the logistics vehicle 520, and/or the storage units 523, which then causes or sends a control signal to the storage units 523 to rotate a corresponding storage unit to the loading location 507 based on the identifiers within the tag. Responsively, the robotic component 505 may load the asset into the storage unit at the loading location 507. This process can then be repeated for other tags and assets traversing down the conveyor apparatus 525 based on the sequence or order each tag of each asset was read in and based on the identifiers in the corresponding tag.

FIG. 6 is a schematic diagram of an environment 600 illustrating how one or more assets are loaded into storage units that are outside of a logistics vehicle, according to some embodiments. The environment 600 includes a conveyor apparatus 625 that includes the reader component 610, a robotic component 605 (e.g., a robotic arm) that loads assets into one or more of the storage units 623, which are located on a platform 640 outside of the logistics vehicle 620. In some embodiments, the conveyor apparatus 625 is communicatively coupled to the logistics vehicle 620 and/or the storage units 623 via a computer network (e.g., 135). In some embodiments, the logistics vehicle 620 represents the logistics vehicle 120 and vice versa, the conveyor apparatus 625 represents the conveyor apparatus 625 and vice versa, and/or the storage units 623 represent the storage units 623 and vice versa.

In some embodiments, one or more components of the environment 600 represent the corresponding component of the environment 500 of FIG. 5 and all of the functionality described, except for the platform 640. That is, in some embodiments, the conveyor apparatus 625 may represent the conveyor apparatus 525, the reader component 610 may represent the reader component 510, the logistics vehicle 620 represents the logistics vehicle 520, the storage units 623 represent the same storage units 523, the robotic component 605 represents the robotic component 505, and the like. A "platform" as described herein includes any apparatus that is raised (e.g., 2 or 3 feet) from a ground surface (e.g., the ground surface 650) and that includes a flat or substantially flat surface configured to receive storage units such that storage units may be placed on the surface of the platform.

FIG. 6 illustrates that the storage units can include or be place onto a building-based rail system 623-1 (that abuts the platform 640) that is configured to rotate and shuffle an individual storage unit to a loading location. In some embodiments, the building-based rail system is the rail system described in U.S. application Ser. No. 16/557,573 titled "Systems, methods, and apparatuses for shifting and staging storage structures and parcels thereon," filed on Aug. 30, 2019, the contents of which are incorporated by reference in its entirety. FIG. 6 further illustrates that the storage units 623 can rotate and shift outside of the logistics vehicle 620. This is because a logistics vehicle is not necessarily needed for sorting. For example, each logistics vehicle may be in use or otherwise occupied such that there are none available for loading. In these embodiments, the platform 640 can be used to place the storage units 623 on. In this way, assets can be loaded onto the storage units 623 and, when a logistics vehicle (e.g., logistics vehicle 620) is available, the storage units 623 (including the rail system 623-1) can be loaded from the platform 640 into the logistics vehicle 620. For example, the rail system 623-1, with some or all of the corresponding assets stored thereon, can be pushed from the platform 640 through the back of the logistics vehicle 620 and onto its bed after each asset has been loaded.

In an example illustration of how components may work together within the environment 600, the reader component 610 may first read a set of asset tags that are attached to corresponding assets. The reader component 610 may communicate with the logistics server(s) 105 and/or the storage units 623, thereby causing, for example, the rail system 623-1 to shuffle one or more storage units of the storage units 623 to a loading location based on the identifiers in the asset tags indicative of the asset attributes and sequence. Responsively, the robotic component 605 may pick or place the corresponding asset into the shuffled or rotated storage unit. Subsequent to the loading of each asset that traverses the conveyor apparatus 625, the entire storage units 623 (e.g., including the rail system 623-1) may be pushed or otherwise moved from the platform 640 into the back of the logistics vehicle 620.

FIG. 7 is a schematic diagram of an environment 700 illustrating how one or more assets are loaded into storage units that are outside of a logistics vehicle, according to some embodiments. The environment 700 includes a conveyor apparatus 725 that includes the reader component 710 and a human operator 705 that loads assets into one or more of the storage units 723, which are located on a ground surface 750 outside of the logistics vehicle 720. In some embodiments, the conveyor apparatus 725 is communicatively coupled to the logistics vehicle 720 and/or the storage units 723 via a computer network (e.g., 135). In some embodiments, the logistics vehicle 720 represents the logistics vehicle 120 and vice versa, the conveyor apparatus 725 represents the conveyor apparatus 725 and vice versa, and/or the storage units 723 represent the storage units 723 and vice versa.

In some embodiments, one or more components of the environment 700 represent the corresponding component of the environment 600 of FIG. 5 and all of the functionality described, except for the platform 640 and the operator 705. That is, in some embodiments, the conveyor apparatus 725 may represent the conveyor apparatus 625, the reader component 710 may represent the reader component 610, the logistics vehicle 720 represents the logistics vehicle 620, and/or the storage units 723 represent the same storage units 623.

FIG. 7 illustrates that a human operator 705 can be used instead of a robotic component (e.g., robotic component 605) and that a platform (e.g., the platform 640) does not necessarily need to be used to load assets. Rather, the storage units 723 can be placed directly on the ground surface 750. FIG. 7 also illustrates that the storage units 723 can be loaded into or include a building-based rail system 723-1. In some embodiments, the rail system 723-1 represents the same building-based rail system 623-1 of FIG. 6.

In an illustrative example of how assets may be loaded in the environment 700, the reader component 710 may first read a sequence of tags corresponding to a plurality of assets. The identifiers in each tag can be transmitted, via a computer network and from the reader component 710 to a logistics server(s) 105. The logistics server(s) 105 may then send a control signal, via the computer network, to the building-based rail system 723-1 to rotate or shift the storage units 723 to a loading location based on the information on each tag, according to the sequence of tags or assets. For instance, a first asset that is read first may be very large and so a first storage unit configured to store large assets is first shifted to a loading location. Responsively, a second-in-line asset that is read second after the first asset may have identifiers indicating that it is very small. Accordingly, the first storage unit may be shifted away from the loading location while a second storage unit may be shifted to the loading location so that the second asset can be loaded into the second storage unit. The second storage unit may be configured to receive small assets. In this way, individual storage units can be shifted or otherwise rotated to a loading location based on corresponding tag identifier data and sequence that a tag is read in for a particular asset.

FIG. 8A is a schematic diagram of an environment 800 illustrating how one or more assets are loaded into storage units that are configured to be adjusted into a U-shape, according to some embodiments. The environment 800 includes a conveyor apparatus 825, a human operator 805 that loads assets into one or more of the storage units 823, which are located on a ground surface 850 outside of the logistics vehicle 820. In some embodiments, the conveyor apparatus 825 is communicatively coupled to the logistics vehicle 820 and/or the storage units 823 via a computer network (e.g., 135). In some embodiments, the logistics vehicle 820 represents the logistics vehicle 120 and vice versa, the conveyor apparatus 825 represents the conveyor apparatus 125 and vice versa, and/or the storage units 823 represent the storage units 123 and vice versa.

In some embodiments, one or more components of the environment 800 represent the corresponding component of the environment 700 of FIG. 7 and all of the functionality described, except for the storage units 723. That is, in some embodiments, the conveyor apparatus 825 may represent the conveyor apparatus 725, and the logistics vehicle 820 represents the logistics vehicle 720.

FIG. 8A illustrates that the storage units 823 are adjustable in order to make them accessible for loading. For example, as illustrated in FIG. 8A, the storage units 823 can be oriented in a U-shape, which ensures each storage unit is accessible by the operator 805. In some embodiments, the operator 805 can use a load chart that specifies which postcode goes with which chart so that the operator 805 can load an incoming asset to a correct storage unit. Although, the storage units 823 are illustrated as being oriented in a U shape, it is understood that this is illustrative only and that the storage units 823 can be adjusted and/or oriented in any suitable shape that allows access, such as orienting the storage units 823 in a circular shape, a single line, a partial oval, and the like. Various embodiments contain components (described with respect to FIG. 8B) that allow such orientation in any suitable shape or fashion.

FIG. 8B is an upper front view of storage units illustrating how individual storage units 823-1 and 823-2 may be oriented and adjusted in order to contribute to the overall U-shape (or any other suitable shape) of the storage units 823, according to some embodiments. As illustrated in FIG. 8B, the storage unit 823-1 includes a top-inner surface 823-1D, a top-upper surface 823-1E, an inside edge 823-1A that extends from the top-inner surface 823-1D down to the bottom surface 823-1G, an outside edge 823-1B that extends from the top outer surface 823-1F to the bottom surface 823-1G, and an adjustable shelf 823-1C. Likewise, the storage unit 823-2 includes a top-inner surface 823-2D, a top-upper surface 823-2E, an inside edge 823-2A that extends from the top-inner surface 823-2D down to the bottom surface 823-2G, an outside edge 823-2B that extends from the top outer surface 823-2F to the bottom surface 823-2G and an adjustable shelf 823-2C.

As illustrated, the inside edges 823-1A and 823-2A (or at least the upper portion of these edges) are fixed, attached, or otherwise coupled together via the fastening mechanism 870. The fastening mechanism 870 may be any suitable fastening mechanism, such as a screw, hook and loop fastener, pin fastener, or the like that fastens at least a portion of the inside edges 823-1A and 823-2A. The fastening mechanism 870 causes a fixed axis to be formed between the storage units 823-1 and 823-2 such that each storage unit 823-1 and 823-2 can swing or pivot about the axis in a 360 degree manner as illustrated by the arrows. For example, as illustrated in FIG. 8B, the top-inner surfaces 823-1D and

823-2D may remain in a relatively fixed position due to the fastening mechanism 870, whereas the top-upper surfaces 823-1E and 823-2E (which have their own inner edges (illustrated in FIG. 8D)) can swing about the axis or away from each other. This allows the U-shape to formulate as illustrated in FIG. 8A. In some embodiments, however, there need not be a fastening mechanism 870. Rather, the individual storage units 823-1 and 823-2 can be individually placed in any suitable orientation or position such that an entire units of storage units can take on any shape, such as a U-shape as described herein (e.g., FIG. 8A).

The shelves 823-1C and 823-2C are adjustable in height parallel to or along the inside and outside edges 823-1A, 823-2A, 823-1B, 823-2B. This may allow for an asset of almost any size to be accommodated by a storage unit. For instance, the shelf 823-1C can be moved higher (e.g., near the inner-upper edge 823-1D) to allow the large asset 840 to be stored in a larger area and the smaller assets 842 to be stored in a smaller area relative to the larger area. The adjusting may occur via any suitable mechanism. For example, the edges 823-1A, 823-2A, 823-1B, 823-2B may include peg holes that are configured to receive pegs that are attached to the shelves 823-1C and/or 823-2C. In this way, each peg hole corresponds to a particular height adjustment. In another example, the shelves 823-1C and/or 823-2C may be moved by hydraulic mechanisms, roller mechanisms, or any other suitable mechanism.

FIG. 8C is a top view of the storage units 823-1 and 823-2 of FIG. 8B illustrating how individual storage units 823-1 and 823-2 may be oriented and adjusted in order to contribute to the overall U-shape (or any other suitable shape) of the storage units 823. The fastening mechanism 870 causes a fixed axis to be formed between the storage units 823-1 and 823-2 such that each storage unit 823-1 and 823-2 can pivot about the axis in a 360 degree manner as illustrated by the arrows in FIG. 8C. The top-inner surfaces 823-1D and 823-2D may remain in a relatively fixed position due to the fastening mechanism 870, whereas the top-upper surfaces 823-1E and 823-2E (which have their own inner edges (not shown)) can swing about the axis or away from each other because they do not have their own fastening mechanism connecting edges. This allows the U-shape to formulate as illustrated in FIG. 8A. Alternatively, the top-upper surfaces 823-1E and 823-2E can swing about the axis or towards each other. This movement would cause the storage units 823-1 and 823-2 to be aligned such that not only are the inner-top surfaces 823-1D and 823-2D connected or aligned, but also the upper top surfaces 823-1E and 823-2E can be connected or aligned. By being aligned, these storage units (and any other plurality of storage units) together can form a straight line of storage units, as opposed to a U-shaped or other non-line non-row shape as illustrated in FIG. 8A.

FIG. 8D is a rear view of the storage units 823-1 and 823-2 of FIG. 8B illustrating how individual storage units 823-1 and 823-2 may be oriented and adjusted in order to contribute to the overall U-shape (or any other suitable shape) of the storage units 823, according to some embodiments. The fastening mechanism 870 causes a fixed axis to be formed between the storage units 823-1 and 823-2 such that each storage unit 823-1 and 823-2 can move about the axis in a 360 degree manner as illustrated in FIG. 8D. The top-inner surfaces 823-1D and 823-2D may remain in a relatively fixed position due to the fastening mechanism 870, whereas the top-upper surfaces 823-1E and 823-2E and corresponding edges 860 and 861 can swing about the axis or away from each other because they do not have their own fastening mechanism connecting edges. This allows the U-shape to formulate as illustrated in FIG. 8A. Alternatively, the top-upper surfaces 823-1E and 823-2E and edges 860 and 861 can swing about the axis or towards each other. This movement would cause the storage units 823-1 and 823-2 to be aligned such that not only are the inner-top surfaces 823-1D and 823-2D connected or aligned, but also the upper top surfaces 823-1E and 823-2E and edges 860 and 861 can be connected or aligned. By being aligned, these storage units (and any other plurality of storage units) together can form a straight line of storage units, as opposed to a U-shaped or other non-line non-row shape.

Referring back to FIG. 8A, after assets are loaded into corresponding storage units, in some embodiments the entire system of storage units 823 can be loaded into the logistics vehicle 820. This can happen in any suitable manner, such as by folding storage units each connected via a fastening mechanism (e.g., identical to the fastening mechanism 870) such that each storage unit is stacked against a corresponding storage unit via moving about an axis formed by a fastening mechanism. For example, this is illustrated by the stacked storage units 723 of FIG. 7.

FIG. 9 is a schematic diagram of an environment 900 illustrating how one or more assets are loaded into storage units that are configured to be adjusted into a semi-circle shape, according to some embodiments. The environment 900 includes a conveyor apparatus 925, a robotic component 905 that loads assets into one or more of the storage units 923, which are located on a platform 940 outside of the logistics vehicle 920. In some embodiments, the conveyor apparatus 925 is communicatively coupled to the logistics vehicle 920 and/or the storage units 923 via a computer network (e.g., 135). In some embodiments, the logistics vehicle 920 represents the logistics vehicle 120 and vice versa, the conveyor apparatus 925 represents the conveyor apparatus 125 and vice versa, and/or the storage units 923 represent the storage units 123 and vice versa.

In some embodiments, one or more components of the environment 900 represents the corresponding component of the environment 800 of FIG. 8A and all of the functionality described, except for the storage units 923 and the platform 940 and the robotic component 905. In some embodiments, the storage units 923 represent the same storage units 823 of FIG. 3 except there are fewer storage units. In this way, each storage unit can be manually fastened or connected or disconnected (e.g., via the fastening mechanism 870) so that more or less storage units can be added or removed from an entire storage unit assembly (i.e., a plurality of storage units).

FIG. 9 illustrates that the storage units 923 are adjustable in order to make them accessible for loading and that a robotic component 905 can be used (instead of a human operator) and that a platform 940 placed on a ground surface 950 can be used (instead of a ground surface only). Specifically, the storage units 923 can be adjusted in shapes other than a complete U-shape, as illustrated in FIG. 8A. For example, FIG. 9 illustrates that the storage units 923 can be shaped in a semi-circular manner for accessibility by the robotic component 905 for loading. Fastening mechanisms, as described with respect to the fastening mechanism 870 of FIG. 8B can make this orientation possible. In an illustrative example, each inside edge of the storage units 923-1, 923-2, 923-3, 923-4, and 923-5 may all be connected via a fastening mechanism identical to fastening mechanism 870. For example, the storage units 923-1 and 923-2 may each represent or include the same components or functionality described with respect to the storage units 823-1 and 823-2 of FIGS. 8B and 8C. Accordingly, this may allow each storage unit to be oriented in a particular fashion about an axis associated with the fastening mechanism given that there is no corresponding fastening mechanism on a rear portion of the storage units 923.

FIG. 10 is a schematic diagram of an environment 1000 illustrating how one or more buffer shelves are used for loading one or more assets, according to some embodiments. The computing environment 100 includes a conveyor apparatus 1025 that includes the reader component 1010, an operator 1005 that loads assets into one or more of the storage units 523, which are located within the logistics vehicle 520. The operator 1005 can additionally or alternatively load one or more assets into the buffer shelves 1033 and 1030. In some embodiments, the conveyor apparatus 1025 is communicatively coupled to the logistics vehicle 1020 and/or the storage units 1023 via the network 135. In this manner, in some embodiments, the logistics vehicle 1020 represents the logistics vehicle 1020 and vice versa, the conveyor apparatus 1025 represents the conveyor apparatus 125 and vice versa, and/or the storage units 1023 represent the storage units 123 and vice versa.

In some embodiments, each component of the environment 1000 represents the corresponding component of the environment 400 of FIGS. 4A and/or 4B and all of the functionality described, except for the buffer shelves 1033 and 1030. That is, in some embodiments, the conveyor apparatus 1025 may represent the conveyor apparatus 425, the reader component 1010 may represent the reader component 410, the logistics vehicle 1020 represents the logistics vehicle 420, the storage units 1023 represent the same storage units 423, and the like. Accordingly, all functionality described above with respect to FIGS. 4A and 4B may be the same for FIG. 5, except for the buffer shelves 1030 and 1033.

FIG. 5 illustrates that the buffer shelves 1033 and 1030 may additionally be used to load assets to. A "buffer shelf" as described herein is a particular storage unit that is configured to receive or store one or more assets based on the one or more assets sharing a same destination location as part of a final mile delivery (e.g., delivery of asset to a particular home or business address) or other shipping operation delivery. In these embodiments, a particular shipment or delivery may have a plurality of assets that are to be delivered to the same destination location. For example, a shipper may order a system or apparatus that has several component pieces that are all shipped as different assets. In some instances, a first storage unit of the storage units 1023 may be full or otherwise occupied for a particular destination location. In these instances, the buffer shelf 1030 and/or 1033 may be used to load other assets that are to be shipped to the same destination location as the asset(s) loaded to the first storage unit. Subsequent to all assets being loaded, the buffer shelves 1030 and 1033 can be loaded into the logistics vehicle 1020.

In an illustrative example, a first asset or tag may traverse past the reader component 1010, which receives information that the first asset is to be delivered to a first destination address. At least partially responsive to this first information that the first asset is to be delivered to the first destination address, the reader component 1010 may communicate, via a computer network, with the logistics server(s) 105, the logistics vehicle, 1020 and/or other component to send a control signal to the storage units 1023, causing a first storage unit configured to receive assets associated with the first asset (e.g., within the same zip code, street, geofence, etc.) to rotate or shift to a loading location that the operator 1005 is standing at. Accordingly, the operator 1005 may load the first asset into the first storage unit. Subsequent to this, the reader component 1010 may read another asset (a second asset) or corresponding tag indicating that the second asset is to be shipped to the same first destination address as the first asset. At least partially responsive (and/or responsive to embodiments indicating that there is no room left in the corresponding first storage unit) the reader component 1010 transmitting this indication that the same first destination address, the logistics server(s) 105, the storage units 1023, and/or the logistics vehicle 1020 may cause a notification to be transmitted to a computing entity 110 associated with the operator 1005 instructing the operator 1005 to place the second asset into the buffer shelf 1030 and/or 1033. Such notification can occur via any suitable mechanism and does not necessarily require a computing entity 110. For example, the reader component 1010, the logistics vehicle 1020, the storage units 1023, and/or the buffer shelves 1030/1033 may include an auditory speaker that is configured to cause an auditory notification to be transmitted such that the operator 1005 can listen to the auditory notification indicating to use the buffer shelf 1030 and/or 1033. Alternatively or additionally, other indicators may be provided, such as flashing lights or other indicators indicative of placing a particular asset on a buffer shelf.

FIG. 11 is a block diagram of an example queue data structure 1100 illustrating how storage units can be rotated or shifted to a loading location, according to some embodiments. The queue data structure represents a first-in-first out (FIFO) data structure where elements are processed in the order received by the data structure 1100. Each of the elements (labeled by their index 0, 1, 2, 3, and 4) represents a particular tag or asset and all of its associated identifier data. In an illustrative example, element 0 indicating an asset ID of 1643 and that it will be shipped to address A may represent some or all of the identifiers in the tag 440 of FIG. 4B. In this way, each storage unit can be rotated or shifted to a loading location based on the sequence of elements in the data structure 1100 and its corresponding identifier data. Although the identifiers only indicate two sets of data in the data structure 1100—an asset ID and address data—it is understood that this is representative only and that any suitable identifiers can exist, such as those described with respect to the tag data of the tag 440 of FIG. 4B, for example (e.g., size of asset, type of asset). Moreover, although the data structure 1100 represents a queue data structure, it is understood that this is representative only and that any suitable data structure can be used, such as a hash map, last-in-first-out (LIFO) data structure, array, linked list, etc.

In an illustrative example of how the data structure 1100 is used to rotate storage units, components associated with FIGS. 4B and 4A are described. The reader 410-2 may first read a first tag of the asset 447 at a first time. Responsively, the data in the tag can be populated at index 0 of the data structure 1100. The data structure 1100 may be populated by the reader 410, the logistics server(s) 105, the logistics vehicle 120, and/or storage units 123. Because index 0 represents the "front" of the data structure 1100 it is also immediately processed. For example, a first storage unit may be configured to store asset ID 1643 based on its size, destination, and/or any other suitable information. Accordingly, the reader component 410 may transmit the data within the first tag, over a computer network, to a logistics server(s) 105 (or other component) which populates the data structure at element 0 and sends a control signal to the storage units 423 to rotate (at a second time subsequent to the first time) the first storage unit to the loading location 407 based on information in the first tag.

Subsequent to the first time and/or the second time, the reader 410-2 may read a second tag (e.g., corresponding to data of the tag 440) of the asset 445 at a third time. Responsively, the data in the second tag can be populated at index 1 of the data structure 1100. Because index 1 represents a position that is processed after index 0, element 1 is processed after element 0. For example, a second storage unit may be configured to store asset ID 1529 based on its size, destination, and/or any other suitable information. Accordingly, the reader component 410 may transmit the data within the second tag, over a computer network, to a logistics server(s) 105 (or other component) which populates the data structure at element 1 and sends a control signal to the storage units 423 to rotate (at a fourth time subsequent to the third time) a second storage unit to the loading location 407 based on information in the second tag.

Subsequent to the third time and/or fourth time, the reader 410-2 may read a third tag of a third asset at a fifth time. Responsively, the data in the third tag can be populated at index 2 of the data structure 1100. Because index 2 represents a position that is processed after index 1, element 2 is processed after element 1. For example, a third storage unit may be configured to store asset ID 1326 based on its size, destination, and/or any other suitable information. Accordingly, the reader component 410 may transmit the data within the third tag, over a computer network, to a logistics server(s) 105 (or other component) which populates the data structure at element 2 and sends a control signal to the storage units 423 to rotate (at a sixth time subsequent to the fifth time) a third storage unit to the loading location 407 based on information in the third tag.

Subsequent to the fifth and/or sixth time, the reader 410-2 may read a fourth tag of a fourth asset at a seventh time. Responsively, the data in the fourth tag can be populated at index 3 of the data structure 1100. Because index 3 represents a position that is processed after index 2, element 3 is processed after element 2. For example, a fourth storage unit may be configured to store asset ID 1354 based on its size, destination, and/or any other suitable information. Accordingly, the reader component 410 may transmit the data within the fourth tag, over a computer network, to a logistics server(s) 105 (or other component) which populates the data structure 1100 at element 3 and sends a control signal to the storage units 423 to rotate (at an eighth time subsequent to the seventh time) a fourth storage unit to the loading location 407 based on information in the fourth tag.

Subsequent to the seventh and/or eighth time, the reader 410-2 may read a fifth tag of a fifth asset at a ninth time. Responsively, the data in the fifth tag can be populated at index 4 of the data structure 1100. Because index 4 represents a last or "rear" position that is processed after index 3, element 4 is processed after element 3 and is processed last (e.g., indicating that there are no other assets on the conveyor apparatus 425). For example, a fifth storage unit may be configured to store asset ID 1222 based on its size, destination, and/or any other suitable information. Accordingly, the reader component 410 may transmit the data within the fifth tag, over a computer network, to a logistics server(s) 105 (or other component) which populates the data structure 1100 at element 4 and sends a control signal to the storage units 423 to rotate (at a tenth time subsequent to the ninth time) the fifth storage unit to the loading location 407 based on information in the fifth tag.

Accordingly, FIG. 11 describes how a sequence of assets can be anticipated such that corresponding storage units can be rotated or shifted based on the particular sequence of elements corresponding to assets that are read and the actual identifier data in each asset. Thus, storage units can be rotated or shifted in a particular order based both on the order in which assets or asset tags are read and the information or identifiers contained in each individual tag.

IV. EXEMPLARY SYSTEM OPERATION

FIG. 12 is a flow diagram of an example process 1200 for causing a storage unit to rotate to a loading location to store one or more assets, according to some embodiments. The process 1200 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein. The computer-implemented method, the system (that includes at least one computing device having at least one processor and at least one computer readable storage medium), and/or the computer program product/apparatus as described herein may perform or be caused to perform the process 1200, and/or any other functionality described herein.

Per block 1201 one or more identifiers of one or more assets are obtained (e.g., by the logistics server(s) 105) in response to a reader component reading one or more tags associated with the one or more assets. In some embodiments a conveyor apparatus that is configured to relay the one or more assets is used such that a first asset of the one or more assets is configured to be picked from the conveyor apparatus and loaded onto a least one storage unit of a plurality of storage units for one or more shipment operations. In particular embodiments, the conveyor apparatus is communicatively coupled to the plurality of storage units or communicatively coupled to one or more computing devices (e.g., the logistics server(s) 105, the logistics vehicle 120, etc.) associated with the plurality of storage units. For example, the reader component may be attached or otherwise coupled to the conveyor apparatus such that each time each tag coupled to an asset traverses past the reader component (e.g., via a belt of the conveyor apparatus), one or more identifiers can be obtained by the reader component and transmitted, over a computer network (e.g., the computer network 135), to the logistics server(s) 105, the computing entity 110, the logistics vehicle 120, and/or the storage units 123. For example, referring back to FIG. 4A, the conveyor apparatus 425 may have a rotating component 425-1 that is configured to cause movement of one or more assets for loading the one or more assets. Each time the rotating component 425-1 causes movement of an asset past the reader component 410, the reader component 410 reads the tag of each asset (e.g., assets 449, 447, and 445), which is then transmitted over the network 435.

An illustrative example of block 1201 is described herein with reference to FIG. 4B. Referring back to FIG. 4B, the reader 410-2 may capture, interrogate, or otherwise read each tag on each asset 447 and 445 to receive identifier(s), such as destination, size, and type of asset as indicated in the tag data of the tag 440. This information may then be transmitted, via the transmitting component 410-3, to the logistics server(s) 105, the computing entity 110, the logistics vehicle 120, and/or the storage units 123 so that one or more of these components obtain these identifiers per block 1201.

Per block 1203, a data structure indicative of asset sequence can be populated (e.g., at least partially in response to the obtaining of the one or more identifiers). In some embodiments, a queue data structure is populated with the obtained identifier(s) and other identifiers associated with other assets that is indicative of an order that assets are traversing on the conveyor apparatus or more specifically, the order in which tags of assets are read. For example, referring back to FIG. 11, the queue data structure 1100 in particular embodiments captures the order that assets are traversing on a conveyor apparatus or the order in which tags of assets are read—a reader first reads a tag associated with asset ID 1643, which is then populated at index 0, the reader then reads a tag associated with asset ID 1529, which is then populated at index 1, the reader then reads a tag associated with asset ID 1326, which is then populated at index 2, the reader then reads a tag associated with asset ID 1354, which is then populated at index 3, the reader then reads a tag associated with asset ID 1222, which is then populated at index 4. In this way, the data structure captures both the sequence in which assets are read in (or traversing down a conveyor apparatus) and identifier data associated with each asset (e.g., the size, weight, destination address, etc.). Based both on the sequence order position of a particular asset and the identifier data of each asset, a corresponding storage unit can be rotated to a loading location, as described below with respect to block 1205.

Per block 1205, a storage unit of a plurality of storage units are caused to automatically rotate to a loading location to receive or store the one or more assets. In some embodiments, this is based on the next-in-line index or element in the data structure and/or identifiers rendered by the tag as described above with respect to block 1203. For example, in some embodiments, the causing of the storage unit of the plurality of storage units to automatically rotate includes sending a control signal to the storage unit that rotates the storage unit to the loading location based at least in part on the identifier and the order the identifier is populated in the queue data structure, as described, for example, with respect to FIG. 11. In another illustrative example, referring back to FIG. 4B, at a first time the reader 410-2 may read the tag of the asset 447 as it traverses down the rotating component 425-1 of the conveyor apparatus 425. The data or identifiers in this tag may then responsively be transmitted, over the network 135, to a logistics server(s) 105, which populates a queue data structure indicating that this is the first element to be processed. Then at a second time subsequent to the first time, the reader 410-2 may read the tag of asset 445 as it is the next-in-line to traverse down the conveyor apparatus 425. The data or identifiers in this tag—i.e., data of the tag 440—may the responsively be transmitted, over the network 135, to the logistics server(s) 105, which populates the same queue data structure, indicating that this is the second element to be processed. Based on reading the first element in the queue data structure (corresponding to asset 447), the logistics server(s) 105 may send a control signal to the storage unit to rotate, shift, and/or otherwise move the first storage unit to a loading location. Based on reading the next-in-line element in the queue data structure (corresponding to asset 445), the logistics server(s) may send another control signal to another storage unit to rotate, shift, or otherwise move the second storage unit to the same loading location. In this way, the first storage unit is replaced with the second storage unit at the loading location based on the asset sequence reading order and the identifier data in each tag. For instance, based on the populating of the data structure, embodiments cause, in near-real time relative to the plurality of assets traversing on the conveyor apparatus, some or each storage unit of the plurality of storage units to rotate to the loading location in an order that the identifier and identifiers are populated in the data structure.

In some embodiments, the precise timing of rotation of storage units to the loading location occurs based on one or more sensor readings. In some embodiments, pressure sensors located one each storage unit are used to determine timing of rotation. For example, referring to the illustrative example above, in response to the asset 447 being loaded (e.g., by an operator or robotic component) into the first storage unit, a first pressure sensor located on the first storage unit may read that the pressure is above a threshold (indicative of an asset having been loaded thereon). Responsive to this reading, storage units 423 may read the next element in a data structure (e.g., the queue data structure 1100) indicating that the next asset to be loaded is asset 445 and responsively cause rotation of the second storage unit to be rotated to the loading location. Alternatively or additionally, a camera with object recognition or detection algorithms can be used. For example, referring to the illustrative example above, in response to the asset 447 being loaded (e.g., by an operator or robotic component) into the first storage location, a camera (e.g., located on the first storage location) may detect an asset is within a distance threshold (e.g., via a range finder sensor). Responsive to this reading, storage units 423 may read the next element in a data structure (e.g., the queue data structure 1100) indicating that the next asset to be loaded is asset 445 and responsively cause rotation of the second storage unit to be rotated to the loading location. Alternatively or additionally, other sensors can be used, such as counters or timers. Accordingly, after a certain time threshold is met (e.g., 10 seconds, 20 seconds, etc.), storage units can rotate to the loading location (e.g., based on next-in-line elements in a data structure and asset identifiers).

In some embodiments, at least one storage unit of the plurality of storage units are configured to rotate to a loading location at least partially responsive to receiving a communication from the conveyor apparatus or the one or more computing devices indicating one or more identifiers associated with the first asset, as described, for example, with respect to FIGS. 4A and 4B. In some embodiments, this communication can occur because a conveyor apparatus may include a transmitting component (e.g., transmitting component 410-3) that is configured to transmit, over a computer network, the identifier obtained by the reader component to the one or more storage units or one or more computing devices associated with the one or more storage units such that the one or more storage units are configured to rotate to a loading location for the loading of the one or more assets in response to receiving the identifier. In some embodiments, the transmitting, over the computer network, of the identifier occurs via a wireless communication link between the conveyor apparatus, a computing device (e.g., the logistics server(s) 105 or computing entity 110), and a logistics vehicle that is configured to house the one or more storage units, as described, for example, with respect to FIGS. 4A and 4B. Alternatively, in some embodiments, the transmitting, over the computer network of the identifier occurs via a wired connection link between the conveyor apparatus and the one or more storage units, as described, for example, with respect to FIGS. 4A and 4B.

In some embodiments, the plurality of storage units are configured to receive one or more assets associated with performing one or more shipment operations and the plurality of storage units are located in a logistics vehicle and the logistics vehicle is configured to carry a plurality of assets associated with the one or more shipment operations (e.g., the logistics vehicle is configured to store assets to drop off at final-mile delivery destination addresses). This is described, for example, with respect to FIG. 4A and FIG. 5. Alternatively, in some embodiments, the plurality of storage units are located on a platform adjacent to a logistics vehicle and the conveyor apparatus, as described, for example, with respect to FIG. 9 and FIG. 6.

In some embodiments, the plurality of storage units are configured to be loaded into a logistics vehicle in response to the loading of the first asset (or any asset) into the at least one storage unit, as described, for example, with respect to FIG. 9, FIG. 8A, FIG. 6, and FIG. 7. For example, referring back to FIG. 7, the storage units 723 (including the rail system 723-1) may be loaded into the logistics vehicle 720 after each asset traversing down the conveyor apparatus 725 has been loaded into the storage units 723.

In some embodiments, a robotic arm component is configured to perform the loading of the first asset (or any asset) into the at least one storage unit of the plurality of storage units, as described, for example, with respect to FIG. 9, FIG. 5, and FIG. 6. Alternatively, in some embodiments, a user operator performs the loading of the first asset (or any asset) into the at least one storage unit of the plurality of storage units. In some embodiments, one or more buffer shelves that are configured to receive a set of assets based on the set of assets sharing a same destination location as part of a final mile delivery are used, as described, for example, with respect to FIG. 10.

In some embodiments the plurality of storage units are configured to receive one or more assets associated with performing one or more shipment operations. In some embodiments, the plurality of storage units are further configured to be placed inside and outside of a logistics vehicle for loading or picking of the one or more parcels. For example, FIG. 4A through FIG. 10 describe that storage units can be located either in a logistics vehicle or outside of the logistics vehicle, such as on a ground surface or platform. In some embodiments, the plurality of storage units include one or more fastening component (e.g., the fastening mechanism 870) that are configured to allow the plurality of storage units to be coupled together and the one or more fastening components further allow at least a portion of the plurality of storage units to pivot about an axis. This is described, for example, with respect to FIG. 8B, where the fastening mechanism 870 allows storage units 823-1 and 823-2 to pivot about an axis so that a U-shape or other shape can be formed using a plurality of storage units.

Definitions

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "data store" as described herein is any type of repository for storing and/or managing data, whether the data is structured, unstructured, or semi-structured. For example, a data store can be or include one or more: databases, files (e.g., of unstructured data), corpuses, digital documents, etc.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

The terms first (e.g., first request), second (e.g., second request), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

The term "causing" or "cause" means that one or more systems (e.g., computing devices) and/or components (e.g., processors) may in isolation or in combination with other systems and/or components bring about or help bring about a particular result or effect. For example, the logistics server(s) 105 may "cause" a message to be displayed to a computing entity 110 (e.g., via transmitting a message to the user device) and/or the same computing entity 110 may "cause" the same message to be displayed (e.g., via a processor that executes instructions and data in a display memory of the user device). Accordingly, one or both systems may in isolation or together "cause" the effect of displaying a message.

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

The following embodiments represent exemplary aspects of concepts contemplated herein. Any one of the following embodiments may be combined in a multiple dependent manner to depend from one or more other clauses. Further, any combination of dependent embodiments (e.g., clauses that explicitly depend from a previous clause) may be combined while staying within the scope of aspects contemplated herein. The following clauses are exemplary in nature and are not limiting:

Clause 1. A system comprising: a plurality of storage units that are configured to receive one or more assets associated with performing one or more shipment operations; and a conveyor apparatus that is configured to relay the one or more assets, wherein a first asset of the one or more assets is configured to be picked from the conveyor apparatus and loaded onto at least one storage unit of the plurality of storage units for the one or more shipment operations, the conveyor apparatus being communicatively coupled to the plurality of storage units or communicatively coupled to one or more computing devices associated with the plurality of storage units; wherein the at least one storage unit of the plurality of storage units is configured to automatically rotate to a loading location at least partially in response to receiving a communication from the conveyor apparatus or the one or more computing devices indicating an identifier associated with the first asset.

Clause 2. The system of clause 1, wherein the plurality of storage units are located in a logistics vehicle, and wherein the logistics vehicle is configured to carry a plurality of assets associated with the one or more shipment operations.

Clause 3. The system of clause 1, wherein the plurality of storage units are located on a platform adjacent to a logistics vehicle and the conveyor apparatus.

Clause 4. The system of clause 3, wherein the plurality of storage units are configured to be loaded into the logistics vehicle at least partially in response to the loading of the first asset into the at least one storage unit.

Clause 5. The system of clause 1, further comprising a robotic arm component that is configured to perform the loading of the first asset into the at least one storage unit of the plurality of storage units.

Clause 6. The system of clause 1, wherein a user operator performs the loading of the first asset into the at least one storage unit of the plurality of storage units.

Clause 7. The system of clause 1, further comprising one or more buffer shelves that are configured to receive a set of assets based on the set of assets sharing a same destination location as part of a final mile delivery.

Clause 8. A conveyor apparatus comprising: a rotating component that is configured to cause movement of one or more assets for loading the one or more assets into one or more storage units; a reader component configured to obtain an identifier associated with the one or more assets; and a transmitting component configured to transmit, over a computer network, the identifier obtained by the reader component to the one or more storage units or one or more computing devices associated with the one or more storage units, wherein the one or more storage units are configured to rotate to a loading location for the loading of the one or more assets in response to receiving the identifier.

Clause 9. The conveyor apparatus of clause 8, wherein the transmitting, over the computer network, of the identifier occurs via a wireless communication link between the conveyor apparatus, a computing device, and a logistics vehicle that is configured to store the one or more storage units.

Clause 10. The conveyor apparatus of clause 8, wherein the transmitting, over the computer network, of the identifier occurs via a wired connection link between the conveyor apparatus and the one or more storage units.

Clause 11 The conveyor apparatus of clause 8, wherein the one or more storage units are located in a logistics vehicle, and wherein the logistics vehicle is configured to carry a plurality of assets associated with one or more shipment operations.

Clause 12. The conveyor apparatus of clause 8, wherein the one or more storage units are located on a platform adjacent to a logistics vehicle and the conveyor apparatus.

Clause 13. The conveyor apparatus of clause 12, wherein the one or more storage units are configured to be loaded into the logistics vehicle in response to the loading of the one or more assets into the one or more storage units.

Clause 14. The conveyor apparatus of clause 8, wherein a robotic component performs the loading of the one or more assets into the one or more storage units.

Clause 15. A computer-implemented method comprising: obtaining an identifier of one or more assets in response to a reader component reading a tag associated with one or more assets as the one or more assets traverse a conveyor apparatus; and at least partially in response to the obtaining of the identifier, causing a storage unit of a plurality of storage units to automatically rotate to a loading location to receive the one or more assets.

Clause 16. The method of clause 15, wherein the one or more assets include a plurality of assets, the method further comprising populating a queue data structure with the identifier and a plurality of other identifiers associated with other assets, the populating of the queue data structure is at least partially indicative of an order that the plurality of assets are traversing on the conveyor apparatus; and based on the populating, causing, in near-real time relative to the plurality of assets traversing on the conveyor apparatus, each storage unit of the plurality of storage units to rotate to the loading location in an order that the identifier and identifiers are populated in the queue data structure.

Clause 17. The method of clause 16, wherein the causing the storage unit of the plurality of storage units to automatically rotate includes sending a control signal to the storage unit that rotates the storage unit to the loading location based at least in part on the identifier and the order the identifier is populated in the queue data structure.

Clause 18. The method of clause 15, wherein the plurality of storage units are located on a platform adjacent to a logistics vehicle and the conveyor apparatus.

Clause 19. The method of clause 15, wherein the plurality of storage units are configured to be loaded into the logistics vehicle in response to the loading of the one or more assets into the storage unit.

Clause 20. The method of clause 15, wherein a robotic component is configured to perform the loading of the one or more assets into the storage unit of the plurality of storage units.

Clause 21. The method of clause 15, wherein a user operator performs a loading of a first asset into a storage unit of the plurality of storage units.

Clause 22. The method of clause 15, further comprising receiving, via one or more buffer shelves, a set of assets based on the set of assets sharing a same destination location as part of a final mile delivery.

Clause 23. A system comprising: a plurality of storage units that are configured to receive one or more assets associated with performing one or more shipment operations; wherein the plurality of storage units are further configured to be placed inside and outside of a logistics vehicle for a loading or picking of the one or more assets; and wherein the plurality of storage units include one or more fastening components that are configured to allow the plurality of storage units to be coupled together and the one or more fastening components further allow at least a portion of the plurality of storage units to pivot about an axis.

Clause 24. The system of clause 23, further comprising: a conveyor apparatus that is configured to relay the one or more assets, wherein a first asset of the one or more assets is configured to be picked from the conveyor apparatus and loaded onto at least one storage unit of the plurality of storage units for the one or more shipment operations.

Clause 25. The system of clause 24, wherein the conveyor apparatus is communicatively coupled to the plurality of storage units or communicatively coupled to one or more computing devices associated with the plurality of storage units, and wherein the at least one storage unit of the plurality of storage units is configured to automatically rotate to a loading location in response to at least partially receiving a communication from the conveyor apparatus or the one or more computing devices indicating an identity of the first asset.

Clause 26. The system of clause 23, wherein the plurality of storage units are configured to be loaded into the logistics vehicle in response to the loading of a first asset into at least one storage unit.

Clause 27. The system of clause 23, further comprising a robotic arm component that is configured to perform the loading or picking of a first asset into or from at least one storage unit of the plurality of storage units.

Clause 28. The system of clause 23, wherein a user operator performs the loading or picking of the one or more assets.

Clause 29. The system of clause 23, further comprising one or more buffer shelves that are configured to receive a set of assets based on the set of assets sharing a same destination location as part of a final mile delivery.

Clause 30. The system of clause 23, further comprising a conveyor apparatus that is configured to cause movement of one or more assets for loading the one or more assets into the plurality of storage units, wherein the conveyor apparatus is further configured to obtain an identifier of the one or more assets, and wherein the conveyor apparatus is further configured to transmit, over a computer network, the identifier to the plurality of storage units or one or more computing devices associated with the plurality of storage units, and wherein the plurality of storage units are configured to rotate to a loading location for the loading of the one or more assets in response to receiving the identifier.

V. CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

What is claimed is:

1. A system comprising:
one or more processors; and
computer storage memory having computer-executable instructions stored thereon which, when executed by the one or more processors, implement operations comprising:
    obtaining an identifier of a first asset in response to a reader component reading a first tag associated with the first asset;
    at least partially in response to obtaining the identifier, populating, at a first time, a data structure indicating a sequence that the reader component read the first tag relative to one or more other tags associated with one or more other assets; and
    at least partially in response to populating the data structure, causing a plurality of storage units to automatically rotate to move a first storage unit of the plurality of storage units to a loading location.

2. The system of claim 1, wherein the operations further comprise:
subsequent to obtaining the identifier of the first asset, obtaining a second identifier of a second asset in response to the reader component reading a second tag associated with the second asset;
in response to obtaining the second identifier, populating, at a second time subsequent to the first time, the data structure indicative of the reader component reading the second tag subsequent to the first tag; and
at least partially in response to populating the data structure at the second time and subsequent to causing the first storage unit to automatically rotate to the loading location, causing the plurality of storage units to automatically rotate to move a second storage unit of the plurality of storage units to the loading location.

3. The system of claim 1, wherein the reader component is coupled to a conveyor apparatus such that reading the first tag occurs as the first asset traverses the conveyor apparatus past the reader component, and obtaining the identifier of the first asset occurs in response to the conveyor apparatus transmitting the identifier over a computer network.

4. The system of claim 1, wherein the identifier of the first asset includes an identification of the first asset, a destination for the first asset, and a size of the first asset.

5. The system of claim 1, wherein the data structure is a queue data structure that is indexed and populated according to an order that the reader component reads the first tag and the one or more other tags associated with the one or more other assets.

6. The system of claim 5, wherein causing the first storage unit of the plurality of storage units to automatically rotate to the loading location comprises sending a control signal to the first storage unit that rotates the plurality of storage units to move the first storage unit to the loading location based at least in part on the identifier and the order.

7. The system of claim 1, wherein the loading location is at a rear portion of a vehicle where an operator is to load the first asset to the first storage unit, the first storage unit being included in the vehicle.

8. The system of claim 1, wherein the operations further comprise, selecting the first storage unit based on at least one of an asset size of the first asset or a final mile delivery destination location of the first asset.

9. The system of claim 1, wherein causing the plurality of storage units to automatically rotate to move the first storage unit to the loading location occurs in near real-time relative to the first asset traversing a conveyor apparatus.

10. A computer-implemented method comprising:
obtaining an identifier for each asset of a plurality of assets in response to a reader component reading a tag coupled to a respective asset of the plurality of assets;
in response to obtaining the identifier for each asset of the plurality of assets, populating a data structure indicative of a sequence that the reader component read the tag for a respective asset of the plurality of assets relative to reading the tag for other assets of the plurality of assets; and
for each asset of the plurality of assets and at least partially based on populating the data structure, causing a plurality of storage units to automatically rotate to move a respective storage unit of the plurality of storage units to a loading location.

11. The computer-implemented method of claim 10, wherein the reader component is coupled to a conveyor apparatus such that reading the tag for each asset of the plurality of assets occurs as a respective asset of the plurality of assets traverses the conveyor apparatus past the reader component, and obtaining the identifier occurs in response to the conveyor apparatus transmitting the identifier over a computer network.

12. The computer-implemented method of claim 10, wherein the identifier includes an identification of a respective asset of the plurality of assets, a destination for the respective asset, and a size of the respective asset.

13. The computer-implemented method of claim 10, wherein the data structure is a queue data structure that is indexed and populated according to an order that the reader component reads the tag for each asset of the plurality of assets.

14. The computer-implemented method of claim 13, wherein causing the plurality of storage units to automatically rotate to move the respective storage unit comprises sending a control signal to the respective storage unit that rotates the plurality of storage units to move the respective storage unit to the loading location based at least in part on the identifier and the order.

15. The computer-implemented method of claim 10, wherein the loading location is at a rear portion of a vehicle where an operator is to load an asset of the plurality of assets to the respective storage unit, and the plurality of storage units is included in the vehicle.

16. The computer-implemented method of claim 10, further comprising selecting the respective storage unit is based on at least one of an asset size of a respective asset of the plurality of assets or a final mile delivery destination location of the respective asset.

17. The computer-implemented method of claim 10, wherein causing the plurality of storage units to automatically rotate to move the respective storage unit to the loading location occurs in near real-time relative to a respective asset of the plurality of assets traversing a conveyor apparatus.

18. One or more computer storage media having computer-executable instructions embodied thereon that, when executed, by one or more processors, cause the one or more processors to perform operations comprising:
obtaining a first identifier of a first asset based at least in part on a reader component reading a first tag associated with the first asset;
based at least in part on obtaining the first identifier, populating, at a first time, a data structure that indicates a sequence that the reader component read the first tag relative to one or more other tags associated with one or more other assets; and based at least in part on populating the data structure, causing a first storage unit located in a storage space of a vehicle to automatically rotate along a support surface of the storage space to a loading location.

19. The one or more computer storage media of claim 18, wherein the operations further comprising:

subsequent to obtaining the first identifier of the first asset, obtaining a second identifier of a second asset based at least in part on the reader component reading a second tag associated with the second asset;

based at least in part on obtaining the second identifier, populating, at a second time subsequent to the first time, the data structure indicating that the reader component read the second tag subsequent to the first tag; and based at least in part on populating of the data structure at the second time and subsequent to causing the first storage unit to automatically rotate to the loading location, causing a second storage unit to automatically rotate to the loading location.

20. The one or more computer storage media of claim 18, wherein the reader component is coupled to a conveyor apparatus such that reading the first tag occurs as the first asset traverses the conveyor apparatus past the reader component, and obtaining the first identifier occurs in response to the conveyor apparatus transmitting the first identifier over a computer network.

\* \* \* \* \*